United States Patent
Honma et al.

(10) Patent No.: US 10,500,817 B2
(45) Date of Patent: *Dec. 10, 2019

(54) ELECTRON-BEAM WELDED JOINT, STEEL FOR ELECTRON-BEAM WELDING, AND METHOD OF MANUFACTURING THE SAME

(75) Inventors: Ryuichi Honma, Tokyo (JP); Ryuji Uemori, Tokyo (JP); Tadashi Ishikawa, Tokyo (JP); Akihiko Kojima, Tokyo (JP); Manabu Hoshino, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 1096 days.

This patent is subject to a terminal disclaimer.

(21) Appl. No.: 13/877,470

(22) PCT Filed: Oct. 27, 2011

(86) PCT No.: PCT/JP2011/074777
§ 371 (c)(1),
(2), (4) Date: Apr. 3, 2013

(87) PCT Pub. No.: WO2012/070354
PCT Pub. Date: May 31, 2012

(65) Prior Publication Data
US 2013/0189536 A1 Jul. 25, 2013

(30) Foreign Application Priority Data
Nov. 22, 2010 (JP) .................. 2010-260458

(51) Int. Cl.
*B32B 15/01* (2006.01)
*C22C 38/00* (2006.01)
(Continued)

(52) U.S. Cl.
CPC ........ *B32B 15/011* (2013.01); *B23K 35/0222* (2013.01); *B23K 35/3053* (2013.01);
(Continued)

(58) Field of Classification Search
CPC ......... C22C 38/00; C22C 38/58; B23K 15/00; C21D 8/02
(Continued)

(56) References Cited

U.S. PATENT DOCUMENTS 5,985,053 A 11/1999 Hara et al.
7,815,755 B2 * 10/2010 Arai et al. .................... 148/335
(Continued)

FOREIGN PATENT DOCUMENTS

EP 1221493 A1 7/2002
EP 1 777 315 A1 4/2007
(Continued)

OTHER PUBLICATIONS

English machine translation of JP H08-155659, EPO, accessed Feb. 20, 2018.*
(Continued)

*Primary Examiner* — Humera N Sheikh
*Assistant Examiner* — Xiaobei Wang
(74) *Attorney, Agent, or Firm* — Birch, Stewart, Kolasch & Birch, LLP

(57) ABSTRACT

A steel for electron-beam welding according to the present invention includes at least C: 0.02% to 0.10%, Si: 0.03% to 0.30%, Mn: 1.5% to 2.5%, Ti: 0.005% to 0.015%, N: 0.0020% to 0.0060%, and O: 0.0010% to 0.0035%, further includes S: limited to 0.010% or less, P: limited to 0.015% or less, and Al: limited to 0.004% or less, with a balance including iron and inevitable impurities. An index value CeEBB obtained by substituting composition of the steel into following Formula 1 falls in the range of 0.42 to 0.65%,
(Continued)

the number of oxide having an equivalent circle diameter of 1.0 μm or more is 20 pieces/mm² or less at a thickness center portion in cross section along the thickness direction of the steel, and the number of oxide containing Ti of 10% or more and having an equivalent circle diameter of not less than 0.05 μm or more and less than 0.5 μm falls in the range of $1\times10^3$ to $1\times10^5$ pieces/mm² at the thickness center portion.

$$CeEBB=C+\tfrac{1}{4}Mn+\tfrac{1}{15}Cu+\tfrac{1}{15}Ni+\tfrac{1}{5}Cr+\tfrac{1}{5}Mo+\tfrac{1}{5}V \quad \text{(Formula 1)}$$

26 Claims, 8 Drawing Sheets

(51) Int. Cl.
| | | |
|---|---|---|
| *B23K 35/02* | (2006.01) | |
| *C22C 38/02* | (2006.01) | |
| *C22C 38/04* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *B23K 35/30* | (2006.01) | |

(52) U.S. Cl.
CPC ........ *B23K 35/3073* (2013.01); *B32B 15/015* (2013.01); *C22C 38/001* (2013.01); *C22C 38/002* (2013.01); *C22C 38/02* (2013.01); *C22C 38/04* (2013.01); *C22C 38/08* (2013.01); *C22C 38/12* (2013.01); *C22C 38/14* (2013.01); *C22C 38/16* (2013.01); *Y10T 428/12222* (2015.01); *Y10T 428/12965* (2015.01)

(58) Field of Classification Search
USPC .............................. 428/679–684; 420/8–129; 219/112.12–112.13
See application file for complete search history.

(56) References Cited

U.S. PATENT DOCUMENTS

| | | | | |
|---|---|---|---|---|
| 8,303,734 | B2 | 11/2012 | Yoshida et al. | |
| 8,361,248 | B2 | 1/2013 | Chijiiwa et al. | |
| 2002/0026969 | A1* | 3/2002 | Nakajima | C21D 8/00 148/648 |
| 2010/0028717 | A1* | 2/2010 | Ishikawa et al. | 428/684 |
| 2010/0330388 | A1* | 12/2010 | Hara | B23K 9/0282 428/586 |
| 2013/0189536 | A1 | 7/2013 | Honma et al. | |

FOREIGN PATENT DOCUMENTS

| | | | | |
|---|---|---|---|---|
| EP | 2060643 | A1 * | 5/2009 | ............ C21D 8/02 |
| JP | 64-15321 | A | 1/1989 | |
| JP | 1-150453 | A | 6/1989 | |
| JP | 3-47918 | A | 2/1991 | |
| JP | 6-122943 | A | 5/1994 | |
| JP | 7-11381 | A | 1/1995 | |
| JP | H08-155659 | * | 6/1996 | |
| JP | 9-279235 | A | 10/1997 | |
| JP | 2000-328178 | A | 11/2000 | |
| JP | 2001-49386 | A | 2/2001 | |
| JP | 2001-207242 | A | 7/2001 | |
| JP | 2001-323336 | A | 11/2001 | |
| JP | 2002-105590 | * | 4/2002 | ............ C22C 38/00 |
| JP | 2003-003233 | A | 1/2003 | |
| JP | 2003-293079 | A | 10/2003 | |
| JP | 2003-321728 | A | 11/2003 | |
| JP | 2004-124167 | A | 4/2004 | |
| JP | 2004-216384 | A | 8/2004 | |
| JP | 2006-37397 | A | 2/2006 | |
| JP | 2006-241551 | A | 9/2006 | |
| JP | 2006-322400 | A | 11/2006 | |
| JP | 2007-21532 | A | 2/2007 | |
| JP | 2007-92406 | A | 4/2007 | |
| JP | 2007-277681 | A | 10/2007 | |
| JP | 2007-322400 | A | 12/2007 | |
| JP | 2008-88504 | A | 4/2008 | |
| JP | 2008-111406 | A | 5/2008 | |
| JP | 2009-127104 | A | 6/2009 | |
| JP | 2010-248590 | * | 11/2010 | ............ C22C 38/00 |
| KR | 10-2009-0045336 | A | 5/2009 | |
| WO | WO 99/16101 | A2 | 4/1999 | |
| WO | WO 2006/009299 | A1 | 1/2006 | |
| WO | WO 2010/052927 | A1 | 5/2010 | |

OTHER PUBLICATIONS

PCT/ISA/210—International Search Report dated Jan. 31, 2012, issued in PCT/JP2011/074777.
European Search Report dated Apr. 1, 2014 issued in European Patent Application No. 11842898.6.
Extended European Search Report, dated Apr. 1, 2014, for European Application No. 11843057.8.
International Search Report, dated Jan. 24, 2012, for International Application No. PCT/JP2011/074776, including an English translation.
Korean Office Action, dated Jan. 2, 2014, for Korean Application No. 10-2013-7013616, including an English translation.
U.S. Notice of Allowance, dated Sep. 30, 2013, for related U.S. Appl. No. 13/988,737.
Korean Notice of Allowance dated Mar. 14, 2018 for corresponding Korean Application No. 10-2013-7012029, with English translation.

\* cited by examiner

ELECTRON-BEAM WELDED JOINT, STEEL FOR ELECTRON-BEAM WELDING, AND METHOD OF MANUFACTURING THE SAME

TECHNICAL FIELD

The present invention relates to a steel for electron-beam welding, which is to be welded by emitting an electron beam to a weld target portion of the steel having a plate-like or foil-like insert metal inserted between groove faces thereof, and a method of manufacturing the steel for electron-beam welding, and further relates to an electron-beam welded joint formed by emitting an electron beam to a weld target portion of the steel having an insert metal inserted between groove faces of the steel.

The present application claims priority based on Japanese Patent Application No. 2010-260458 filed in Japan on Nov. 22, 2010, the disclosures of which are incorporated herein by reference in their entirety.

BACKGROUND ART

In recent years, there arise problems of reducing $CO_2$ gas, which is said to be a cause of global warming, or future exhaustion of oil or other fossil fuels. To address these problems, recyclable natural energy has been actively used. Wind power is a promising form of recyclable natural energy, and large-scale wind power plants have been increasingly constructed.

The most suitable area for wind power generation to be constructed is an area where strong winds are expected to blow constantly, and off-shore wind power generators are under development or actually in operation all over the world (see Patent Documents 1 to 4).

In order to build a tower for wind power generation at sea, it is necessary to drive the foundation portion of the tower into the sea bed. Further, in order to obtain a sufficient height for the turbine blades of the wind power generator from the sea level, the foundation portion of the tower is required to have a sufficient length.

Thus, the foundation portion of the tower of the wind power generator employs a steel pipe structure having a wall thickness exceeding 50 mm, for example, approximately 100 mm, and a large diameter in cross section of approximately 4 m. Further, the total height of the tower is as high as 80 m or more. In recent years, a large steel-structure such as the tower for the wind power generation is required to be built through electron beam welding on the coast near the construction site in an easy and efficient manner.

In other words, under the circumstances described above, there arises a new technical demand for welding an ultra-thick steel plate having a thickness of 100 mm on-site in a highly efficient manner.

In general, a high-energy-density beam welding such as electron beam welding and laser beam welding exhibits high efficiency. However, the thickness of the steel plate to be welded with the laser beam has been limited. Further, the conventional electron-beam welding is required to be performed in a vacuum chamber under a high vacuum state. Thus, conventionally, the thickness or size of the steel plate that can be welded through the high-energy-density beam welding largely depends on the capacity of welding equipment or the inner size of the vacuum chamber.

In recent years, to address the circumstances described above, an electron-beam welding method has been proposed that employs reduced pressure in the vicinity of a portion to be welded, thereby efficiently welding an ultra-thick steel plate with a thickness of approximately 100 mm on-site. For example, the Welding Institute of the United Kingdom has developed a welding method (reduced pressured electron beam welding: RPEBW) enabling operation under a low vacuum state (see Patent Document 5).

With the reduced pressure electron beam welding (RPEBW), it is possible to efficiently perform welding, by locally reducing the pressure of the portion to be welded to be in a vacuum state in the case where a large-scale steel structure such as the tower of a wind power generator is constructed. The RPEBW method is performed in a state in which the degree of vacuum is low as compared with the method of performing welding in the vacuum chamber.

In general, a fracture toughness value δc based on fracture mechanics is known as an index for quantitatively evaluating the safety of a welded structure. The δc can be obtained through a crack tip opening displacement (CTOD) test. The fracture toughness is affected by the size of a test piece. Thus, although favorable results can be obtained through a small-sized test such as the conventional V-notch Charpy impact test, it is not always true that the favorable fracture toughness value δc can be obtained through the CTOD test with a welded joint in the large-scale steel.

The electron-beam welding method is a method that employs energy of the electron beam to once melt and then solidify the base material of a weld target portion, thereby performing welding. Normally, the components of the molten metal in the electron-beam welding method are almost the same as those of the base metal (steel). On the other hand, with the large-heat input arc welding such as electro gas welding, mechanical properties such as hardness of the welded metal and the fracture toughness value δc are adjusted by using, for example, welding wire. It is difficult to use the welding wire in the electron-beam welding method.

In view of the above-described circumstances, a method of optimizing the hardness or cleanliness of the welded metal (WM) has been proposed to improve the fracture toughness value δc of the electron-beam welded joint (see, for example, Patent Documents 6 and 7). Patent Document 6 proposes setting the hardness of the welded metal to be more than 110% and not more than 220% of that of the base metal, and the width of the welded metal to be 20% or less of the thickness of the steel. Further, Patent Document 7 proposes setting the amount of O in the welded metal to 20 ppm or more, and the number of oxide having a grain diameter of 2.0 μm or more to 10 pieces/mm$^2$ or less.

RELATED ART DOCUMENTS

Patent Document

Patent Document 1: Japanese Unexamined Patent Application, First Publication No. 2008-111406

Patent Document 2: Japanese Unexamined Patent Application, First Publication No. 2007-092406

Patent Document 3: Japanese Unexamined Patent Application, First Publication No. 2007-322400

Patent Document 4: Japanese Unexamined Patent Application, First Publication No. 2006-037397

Patent Document 5: PCT International Publication No. WO 99/16101

Patent Document 6: Japanese Unexamined Patent Application, First Publication No. 2007-21532

Patent Document 7: Japanese Unexamined Patent Application, First Publication No. 2008-88504

DISCLOSURE OF THE INVENTION

Problems to be Solved by the Invention

When the tower of a wind power generator at sea is constructed, steels are abutted to each other to weld, and the welded steels are used without applying any thermal treatment to the welded portion. Thus, a welded metal (WM) and a weld heat-affected zone (HAZ: heat-affected zone, hereinafter, simply referred to as "heat-affected zone") are required to have excellent toughness. In the case of the electron-beam welding, since the welding wire is not used, the toughness of the welded metal and the heat-affected zone is controlled by adjusting the components of the base metal.

Conventionally, there is proposed a method of controlling a relationship between inclusions in the welded metal, the hardness of the welded metal, and the hardness of the base metal, or the width of the welded metal. However, in the case where the toughness of the heat-affected zone is not sufficient, the fracture toughness of the welded portion as a whole reduces.

It should be noted that, by attaching a plate-like or foil-like Ni (insert metal) to a surface to be welded (groove face) and applying electron-beam welding, it is possible to enhance the toughness of the welded metal (WM) so as to be higher than that of the base metal. However, in this case, the difference in hardness between the welded metal and the heat-affected zone significantly increases if the components of the base metal are not appropriate. This leads to a significant reduction in the fracture toughness value δc of the heat-affected zone where the difference in hardness is significantly large.

From the study made by the present inventors, even if the insert metal is not used, the components appropriate for improving the toughness are not always the same between the welded metal and the heat-affected zone in the electron-beam welded joint. Thus, the high toughness cannot be obtained at the welded metal even if the electron-beam welding is applied to the conventional high-HAZ-toughness steel for arc welding. Further, the high toughness cannot be obtained at the heat-affected zone even if the components of the steel for arc welding are optimized by taking the toughness of the welded metal formed by the electron-beam welding into consideration.

In other words, the electron-beam welding and the arc welding are fundamentally different in terms of the welding method and the formed joint structure. Thus, the problem of the electron-beam welding cannot be solved by using the manner for solving the problem of the arc welding.

The present invention has been made in view of the circumstances described above, and an objective of the present invention is to provide a steel for electron-beam welding having a thickness of 45 mm or more, constituting the foundation portion of the tower of a wind power generator at sea, and enabling formation of a welded joint exhibiting increased strength and appropriately balanced fracture toughness values between a welded metal (WM), a heat-affected zone (HAZ) and a base metal (BM) obtained by emitting an electron beam to a weld target portion having a plate-like or foil-like insert metal inserted between groove faces, and a method of manufacturing the steel. Another objective of the present invention is to provide an electron-beam welded joint formed by emitting an electron beam to a weld target portion having a plate-like or foil-like insert metal inserted between groove faces of this steel.

Means for Solving the Problems

The present invention provides a steel for electron-beam welding to be welded by emitting an electron beam to a weld target portion having a plate-like or foil-like insert metal inserted between groove faces thereof, in which Mn of 1.5 mass % or more is added to secure hardenability, the amount of Al is reduced as much as possible, an appropriate amount of Ti is added, and fine oxide grain containing Ti of 10% or more (hereinafter, simply referred to as Ti-containing oxide) is dispersed in the steel. This Ti-containing oxide is used as a pinning grain having a function of suppressing grain growth, and a nucleus for intra-granular transformation to appropriately balance the fracture toughnesses of the welded metal (WM), the heat-affected zone (HAZ), and the base metal (BM).

In particular, with the electron-beam welding in which the widths of the WM and the HAZ are narrow and the heat-inputted amount is low, the Ti-containing oxide significantly effectively works as the nucleus for the intra-granular transformation of the welded metal (WM) and the heat-affected zone (HAZ), and greatly contributes to preventing microstructure from coarsening.

Further, according to the present invention, index values obtained through newly introduced index formulas CeEBB and CeEBW for hardenability after electron-beam welding are controlled to appropriately balance the fracture toughnesses of the steel (BM), the welded metal (WM), and the heat-affected zone (HAZ), thereby securing desired fracture toughness of the electron-beam welded joint as a whole, which is formed by using the insert metal. Further, with the present invention, while the amount of Mn is increased to enhance hardenability, the amount of Cr, Mo, Cu, Ni, and/or Nb is reduced to reduce the cost required for manufacturing the steel for electron-beam welding.

The indices CeEBB and CeEBW of hardenability after electron-beam welding are indices newly introduced by the present inventors to improve the fracture toughness of the electron-beam welded joint formed by using the insert metal. The technical meaning of the indices CeEBB and CeEBW will be described later together with the technical meaning of an index (ratio) "C/CeEBB" (C: the amount of C), which is also introduced.

The followings are main points of the present invention.
(1) An electron-beam welded joint according to one aspect of the present invention provides an electron-beam welded joint having a welded metal and obtained by applying an electron beam to a steel. The steel has a composition including, by mass %, C: 0.02% to 0.10%, Si: 0.03% to 0.30%, Mn: 1.5% to 2.5%, Ti: 0.005% to 0.015%, N: 0.0020% to 0.0060%, O: 0.0010% to 0.0035%, Nb: 0% to 0.020%, V: 0% to 0.030%, Cr: 0% to 0.50%, Mo: 0% to 0.50%, Cu: 0% to 0.25%, Ni: 0% to 0.50%, B: 0% to 0.0030%, S: limited to 0.010% or less, P: limited to 0.015% or less, and Al: limited to 0.004% or less, with a balance including iron and inevitable impurities. In the electron-beam welded joint, an index value CeEBB obtained by substituting the composition of the steel into following Formula 1 falls in the range of 0.42% to 0.65%, the number of oxides having an equivalent circle diameter of 1.0 μm or more is 20 pieces/mm² or less at a thickness center portion in cross section along the thickness direction of the steel, the number of oxide containing Ti of 10% or more and having an equivalent circle diameter of 0.05 μm or more and less than 0.5 µm falls in the range of $1\times10^3$ to $1\times10^5$ pieces/mm² in the thickness direction, the welded metal has a composition including, by mass %, C: 0.02% to 0.10%, Si: 0.03% to 0.30%, Mn: 1.2% to 2.4%, Ni: 1.0% to 2.3%, Ti: 0.005% to 0.015%, N: 0.0020% to 0.0060%, O: 0.0004% to 0.0020%, Nb: 0% to 0.020%, V: 0% to 0.030%, Cr: 0% to 0.50%, Mo: 0% to 0.50%, Cu: 0% to 0.25%, B: 0% to 0.0030%, S: limited to 0.010% or less, P: limited to 0.015% or less, Al: limited to 0.004% or less, with a balance including iron and inevitable impurities, an index value CeEBW obtained by substituting the composition of the welded metal into following Formula 2 falls in the range of 0.56% to 0.73%.

$$CeEBB = C + \tfrac{1}{4}Mn + \tfrac{1}{15}Cu + \tfrac{1}{15}Ni + \tfrac{1}{5}Cr + \tfrac{1}{5}Mo + \tfrac{1}{5}V \quad \text{(Formula 1)},$$

where C, Mn, Cu, Ni, Cr, Mo, and V represent mass % of elements contained in the composition of the steel.

$$CeEBW = C + \tfrac{1}{4}Mn + \tfrac{1}{15}Cu + \tfrac{1}{15}Ni + \tfrac{1}{5}Cr + \tfrac{1}{5}Mo + \tfrac{1}{5}V \quad \text{(Formula 2)},$$

where C, Mn, Cu, Ni, Cr, Mo, and V represent mass % of elements contained in the composition of the welded metal.
(2) In the electron-beam welded joint according to (1) above, a C/CeEBB, which is a ratio of the amount of C in the steel by mass % relative to the index value CeEBB, may fall in the range of 0.02 to 0.15.
(3) In the electron-beam welded joint according to (1) or (2) above, the steel thickness may have a thickness in the range of 45 to 150 mm.
(4) In the electron-beam welded joint according to (1) or (2) above, the electron-beam welded joint may satisfy $0.8 \leq \delta_{BM}/\delta_{WM} \leq 1.25$, and $0.5 \leq \delta_{HAZ}/\delta_{WM} \leq 1.1$, where $\delta_{WM}$ is a CTOD value of the welded metal, $\delta_{HAZ}$ is a CTOD value of a weld heat-affected zone, and $\delta_{BM}$ is a CTOD value of the steel.
(5) A steel for electron-beam welding according to another aspect of the present invention has a composition including by mass % C: 0.02% to 0.10%, Si: 0.03% to 0.30%, Mn: 1.5% to 2.5%, Ti: 0.005% to 0.015%, N: 0.0020% to 0.0060%, O: 0.0010% to 0.0035%, Nb: 0% to 0.020%, V: 0% to 0.030%, Cr: 0% to 0.50%, Mo: 0% to 0.50%, Cu: 0% to 0.25%, Ni: 0% to 0.50%, B: 0% to 0.0030%, S: limited to 0.010% or less, P: limited to 0.015% or less, and Al: limited to 0.004% or less, with a balance including iron and inevitable impurities. In the steel, an index value CeEBB obtained by substituting the composition of the steel into following Formula 1 falls in the range of 0.42% to 0.65%, the number of oxide having an equivalent circle diameter of 1.0 µm or more is 20 pieces/mm² or less at a thickness center portion in cross section along the thickness direction of the steel, and the number of oxide containing Ti of 10% or more and having an equivalent circle diameter of not less than 0.05 µm and less than 0.5 µm falls in the range of $1\times10^3$ to $1\times10^5$ pieces/mm² at the thickness center portion.

$$CeEBB = C + \tfrac{1}{4}Mn + \tfrac{1}{15}Cu + \tfrac{1}{15}Ni + \tfrac{1}{5}Cr + \tfrac{1}{5}Mo + \tfrac{1}{5}V \quad \text{(Formula 1)},$$

where C, Mn, Cu, Ni, Cr, Mo, and V represent mass % of elements in the composition of the steel.
(6) In the steel for electron-beam welding according to (5) above, a C/CeEBB, which is a ratio of the amount of C in the steel by mass % relative to the CeEBB, may fall in the range of 0.02 to 0.15.
(7) In the steel for electron-beam welding according to (5) or (6) above, the thickness of the steel may fall in the range of 45 to 150 mm.
(8) A manufacturing method according to another aspect of the present invention provides a method of manufacturing a steel for electron-beam welding according to (5) or (6) above, the method including: when the steel is subjected to casting, cooling the steel in a manner such that a cooling rate in a temperature range of 1300° C. to 1100° C. is 9° C./min or more, and after casting, heating the steel to a temperature range of 950° C. to 1150° C., and then, applying a thermomechanical treatment.

In order to obtain the predetermined CTOD value (fracture toughness value) in the electron-beam welded joint, it is important to appropriately balance the fracture toughness values of the steel (BM), the welded metal (WM), and the heat-affected zone (HAZ).

In other words, even if the fracture toughness of the steel (base metal) and the fracture toughness of the heat-affected zone are excellent, the welded metal becomes the starting point of the breakage when the fracture toughness of the welded metal is insufficient. Further, even if the fracture toughness of the welded metal is excellent, breakage advances from the heat-affected zone when the fracture toughness of the heat-affected zone is insufficient. As described above, when the fracture toughness varies from portion to portion in the welded joint, the fracture toughness of the welded joint as a whole deteriorates.

Brittle fracture at the welded portion (welded metal and heat-affected zone) of the steel with a yield strength of 355 MPa class, to which the electron-beam welding is applied, starts to occur from the coarsened grain boundary ferrite generated from the prior austenite grain, upper bainite, ferrite side plate or other portion.

A unit of fracture surface created at the time when the brittle fracture starts from the coarsened ferrite generated from the above-described micro-structure or prior austenite grain boundary is dependent upon the grain diameter of the prior austenite. Thus, the fracture toughness of the welded portion can be improved by reducing the grain diameter of the micro-structure in the welded metal and the heat-affected zone by using the pinning effect obtained from precipitates or intra-granular transformation.

Based on the facts described above, according to the present invention, Al in the molten steel is reduced, and Ti is added, thereby generating an appropriate amount of fine Ti-containing oxide having an appropriate grain diameter in the base metal as well as the prior austenite grain in the welded metal and the heat-affected zone of the welded portion obtained by applying the electron-beam welding to the base metal while involving the insert metal containing Ni. With the electron-beam welding employing the low amount of heat inputted, the fine Ti-containing oxide remains in the heat-affected zone (HAZ) to function as the pinning grain that suppresses the grain growth. Thus, the grain growth in the heat-affected zone is suppressed, whereby the fracture toughness improves.

Further, the fine Ti-containing oxide serves as a product nucleus in the intra-granular transformation to generate intra-granular ferrite especially in the heat-affected zone. Note that the Ti-containing oxide is an oxide containing Ti of 10% or more, and includes, for example, TiO and $Ti_2O_3$. The Ti-containing oxide may contain elements other than Ti and oxygen.

As a result, the structure of the heat-affected zone becomes fine, and the fracture toughnesses of the steel (base metal), the heat-affected zone, and the welded metal improve while the balance between these three fracture toughnesses improves.

Effects of the Invention

According to the present invention, it is possible to suppress the deterioration in the fracture toughnesses of a welded metal and a heat-affected zone of an electron-beam welded joint formed by applying electron-beam welding to a weld portion of a steel with a yield strength of 355 MPa class while an insert metal containing Ni is involved. Further, it is possible to provide an electron-beam welded joint having the fracture toughnesses of the steel (base metal), the heat-affected zone and the welded metal appropriately balanced while reducing the cost of the steel that can be used for forming the welded joint.

EMBODIMENTS OF THE INVENTION

When the tower of a wind power generator is constructed at sea, the steel after welded is used without applying any thermal treatment to the joint portion. Thus, the welded metal and the heat-affected zone are required to have excellent toughness. According to the present invention, in order to make the welded metal have a toughness equal to that of the base metal, the electro-beam welding is applied to the weld portion while an insert metal containing Ni is involved.

Conventionally, the electron-beam welding has been used for a steel such as steel containing a large amount of Cr or Mo (so-called Cr—Mo steel), stainless steel, and a high-Ni steel, which do not require generation of oxide in the welded metal. No brittle phase is generated in the heat-affected zone of the stainless steel. Further, a Cr—Mo steel has a structure of the heat-affected zone formed by lower bainite having excellent toughness as qualitatively illustrated in FIG. 1, exhibiting significantly high toughness.

The thickness and the strength of the steel used for the electron-beam welded joint according to this embodiment of the present invention are not particularly limited. However, it is preferable to use, for example, steel for a structure used, for example, for the tower of a wind power generator at sea and having a thickness in the range of 45 to 150 mm, YP (yield point) in the range of approximately 315 to 550 MPa, and TS (tensile strength) in the range of approximately 450 to 690 MPa. Depending on application, the upper limit of the thickness may be set to 120 or 130 mm. The lower limit of YP may be set to 340 MPa or 355 MPa, and the upper limit of YP may be set to 500 MPa, 460 MPa, or 420 MPa. The lower limit of TS may be set to 470 MPa or 490 MPa, and the upper limit of TS may be set to 600 MPa, 570 MPa, or 550 MPa.

Figure 1:
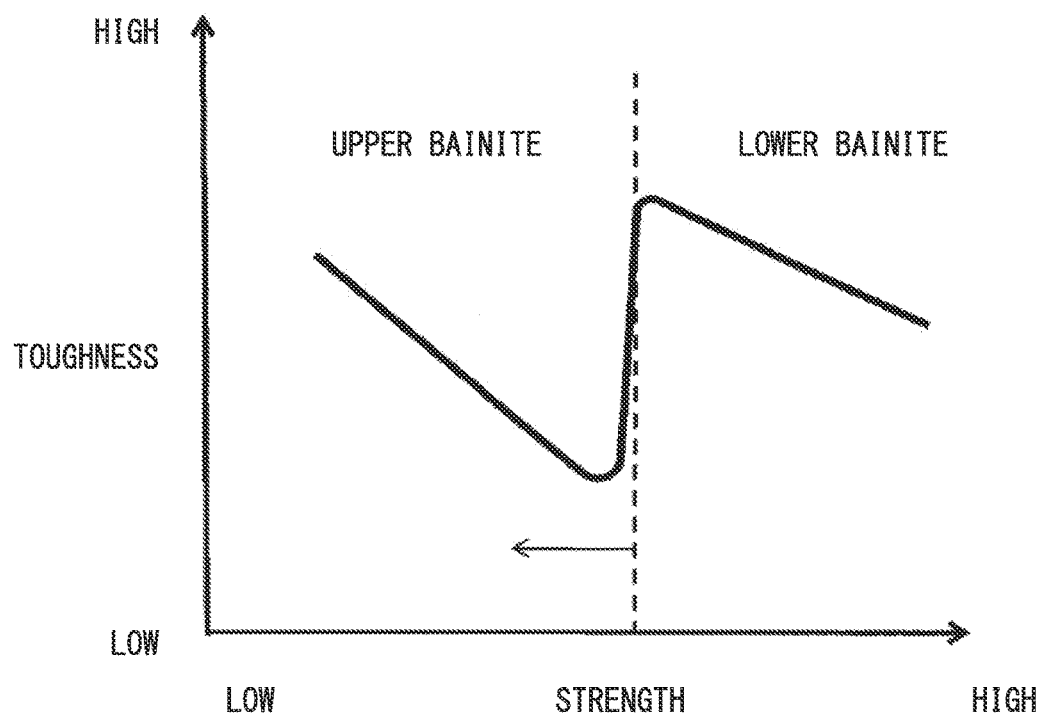
FIG. 1 is a diagram qualitatively illustrating a relationship between strength, toughness and a metal structure of a steel.

This type of steel has a strength lower than that of the Cr—Mo high-strength steel and has a heat-affected zone with a structure formed by an upper bainite having reduced toughness as qualitatively illustrated in FIG. 1. When this steel is subjected to the electron-beam welding, a coarsened structure such as grain boundary ferrite or upper part bainite develops particularly in the heat-affected zone, and the high-carbon martensite (also called island martensite or M-A constituent) is likely to be generated. Thus, in the case where the electron-beam welding is applied to the steel for a structure, it is not easy to secure the toughness of the heat-affected zone.

Figure 2A:
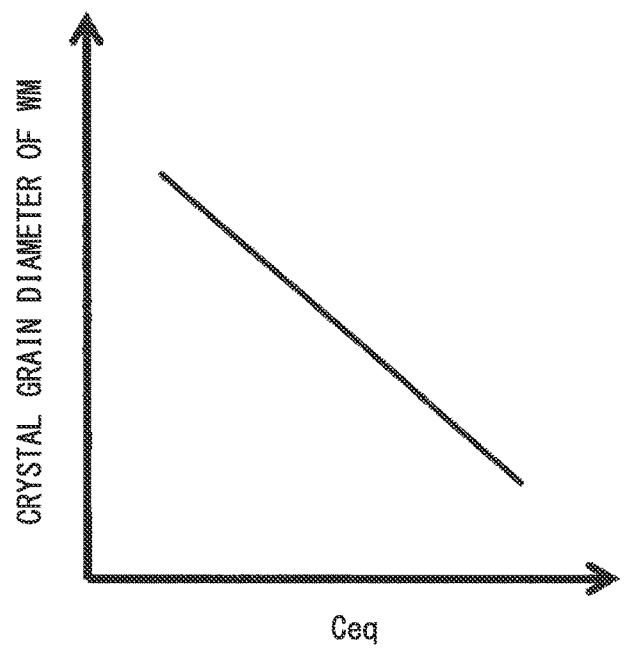
FIG. 2A is a diagram qualitatively illustrating a relationship between hardenability and crystal grain diameter of a welded metal.
Figure 2B:
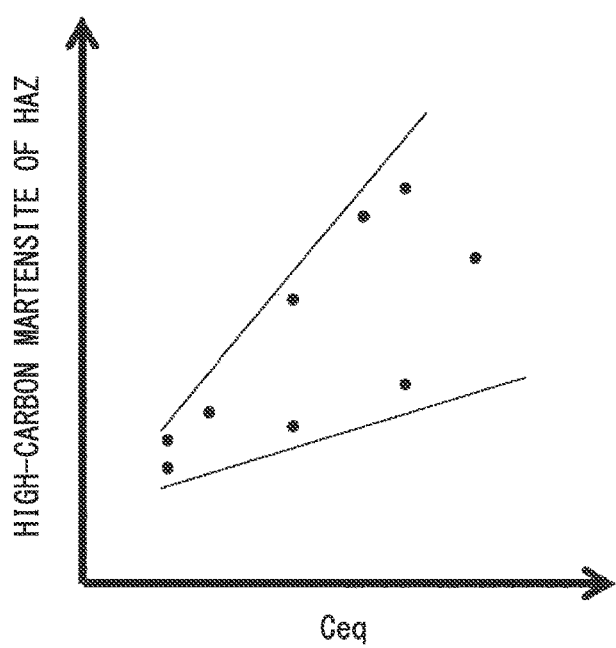
FIG. 2B is a diagram qualitatively illustrating a relationship between hardenability and the amount of high-carbon martensite in a heat-affected zone.

As for the relationship between the structure and the toughness, it is known that a reduction in the crystal grain diameter is particularly effective in improving the toughness of the fusion-welded metal, and the high-carbon martensite particularly reduces the toughness of the heat-affected zone. Further, as for the relationship between the components and the structure, it is known that, as the hardenability index Ceq increases, the grain diameter of the welded metal reduces as illustrated in FIG. 2A, and the high-carbon martensite of the heat-affected zone increases as illustrated in FIG. 2B.

Figure 3:
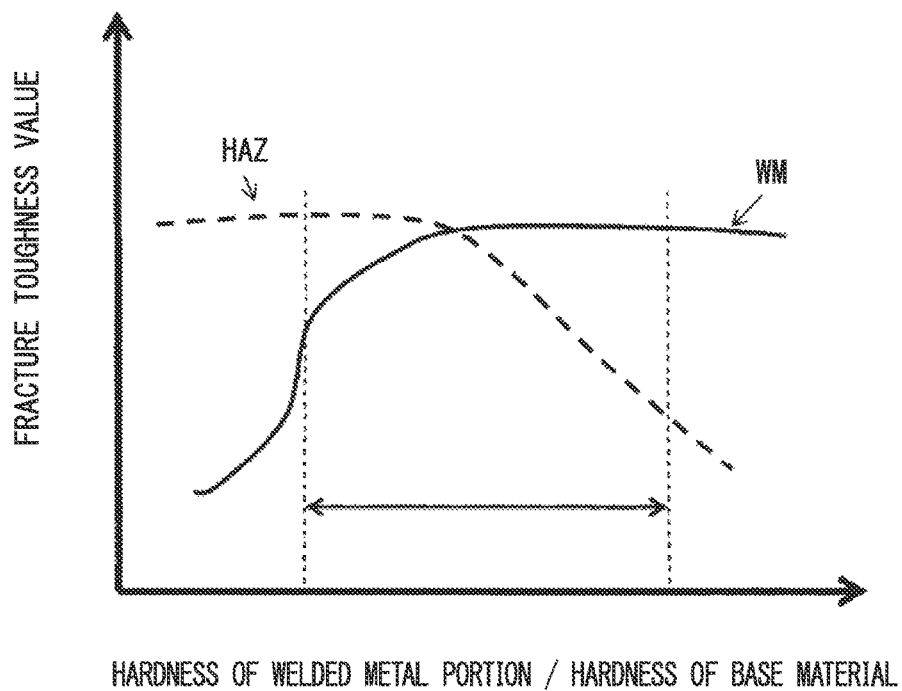
FIG. 3 is a diagram qualitatively illustrating a relationship between a ratio of hardness of the welded metal relative to hardness of the steel (base metal), and the fracture toughnesses of the welded metal and the heat-affected zone.

Further, in order to enhance the toughness of the welded metal and the heat-affected zone, it is important to balance the hardness of the welded metal and the hardness of the steel (base metal). In other words, as illustrated in FIG. 3, the toughness of the welded metal improves with the increase in the hardness of the welded metal relative to the hardness of the steel (base metal). However, a deformation concentrates on the heat-affected zone due to the effect of the increase in the hardness of the welded metal, which results in a decrease in the toughness of the heat-affected zone. For these reasons, if the hardenability is increased to prevent generation of the upper bainite having less toughness, the welded metal hardens, which causes a problem of deterioration in the toughness of the heat-affected zone.

As described above, the relationship between the hardenability of the steel and the crystal grain diameter of the WM or high-carbon martensite of the HAZ, and the relationship between the ratio of the hardness of the WM relative to the hardness of the steel (base metal) and the toughness of the welded joint have been qualitatively known. However, conventionally, there is no concept of controlling the balance of the fracture toughness of the welded joint using the components of the steel. Thus, for example, in the case where the electron-beam welding is applied to the steel (base material) having enhanced hardenability, a problem of significantly deteriorating the toughness of the HAZ arises although the toughness of the WM improves.

In view of the facts described above, the present inventors studied an index indicating the hardenability suitable for the electron-beam welding in order to obtain excellent toughness through the electron-beam welding with the insert being involved, and found and newly introduced "indices CeEBB and CeEBW of hardenability after electron-beam welding." More specifically, the present inventors paid attention to the hardenability that largely affects the formation of the structure of the steel to further enhance the fracture toughness of the electron-beam welded joint, and obtained the "index CeEBB of hardenability after electron-beam welding" given by the following Formula 1 and the "index CeEBW of hardenability after electron-beam welding" given by the following Formula 2 that take into consideration that a desired structure is reliably generated.

$$CeEBB = C + \frac{1}{4}Mn + \frac{1}{15}Cu + \frac{1}{15}Ni + \frac{1}{5}Cr + \frac{1}{5}Mo + \frac{1}{5}V \quad \text{(Formula 1)}$$

In this formula, C, Mn, Cu, Ni, Cr, Mo, and V represent the amount of these elements contained (mass %) in the base metal of the electron-beam welded joint, in other words, the steel used for the electron-beam welded joint. The unit of the value of CeEBB is mass %.

$$CeEBW = C + \frac{1}{4}Mn + \frac{1}{15}Cu + \frac{1}{15}Ni + \frac{1}{5}Cr + \frac{1}{5}Mo + \frac{1}{5}V \quad \text{(Formula 2)}$$

In this formula, C, Mn, Cu, Ni, Cr, Mo, and V represent the amount of these elements contained (mass %) in the welded metal of the electron-beam welded joint. The units of the value of CeEBW are in mass %.

It should be noted that, in the case where any of these elements is not added to the steel, 0 is substituted into Formula 1 and Formula 2 as the amount of that element.

For example, in the case where none of Cu, Ni, Cr, Mo, and V is added to the steel, it is only necessary to use Formula 1' for CeEBB instead of Formula 1 described above, and Formula 2' for CeEBW instead of Formula 2 described above.

$$CeEBB = C + \frac{1}{4}Mn \quad \text{(Formula 1')}$$

$$CeEBW = C + \frac{1}{4}Mn \quad \text{(Formula 2')}$$

However, in the case where Cu, Ni, Cr, Mo, and V are contained as inevitable impurities, it is preferable to calculate CeEBB and CeEBW using Formula 1 and Formula 2, respectively.

CeEBB defined by Formula 1 is an index generated on the basis of the known carbon equivalent Ceq ($=C+\frac{1}{6}Mn+\frac{1}{15}Cu+\frac{1}{15}Ni+\frac{1}{5}Cr+\frac{1}{5}Mo+\frac{1}{5}V$) that correlates with the hardness and with consideration that the amount of Mn reduces due to evaporation at the time of electron-beam welding, which leads to a reduction in the hardenability. Note that a coefficient relating to Mn is set to ¼ based on the degree of reduction in the hardenability obtained through experiments and resulting from the decrease in the amount of Mn in the electron-beam welded joint formed by involving the insert metal.

The index value CeEBB is an index used for: (1) obtaining a desired range of hardenability of the welded metal after the electron-beam welding employing a Ni-containing foil, by adjusting the components of the steel (base metal); (2) facilitating generation of fine ferrite in the welded metal; and (3) suppressing generation of the upper bainite or high-carbon martensite that reduce the toughness of the heat-affected zone after the electron-beam welding.

Figure 4:
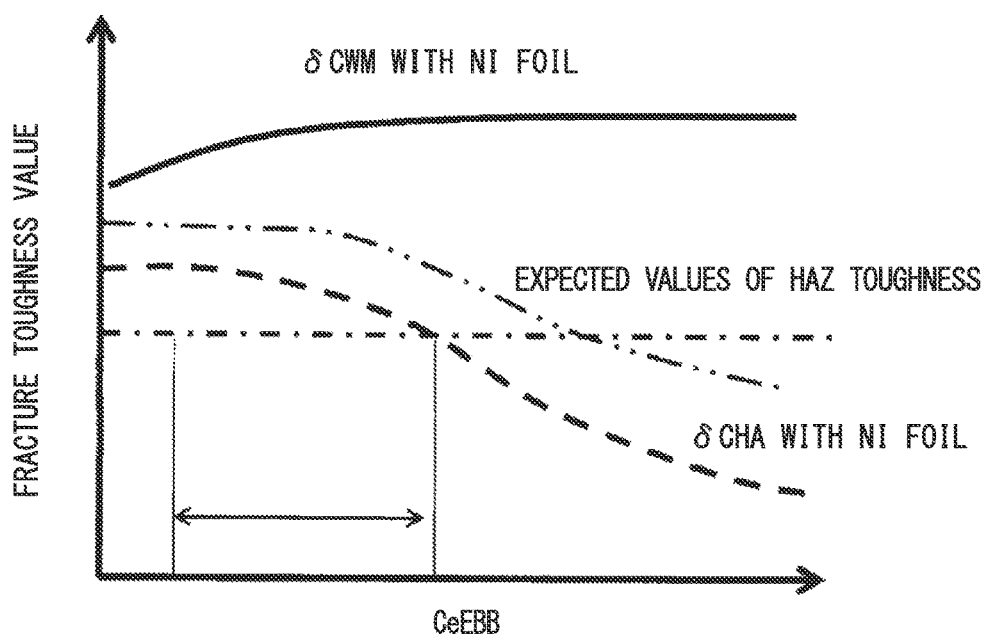
FIG. 4 is a diagram qualitatively illustrating a relationship between CeEBB and a fracture toughness value ($\delta c$) of the welded metal and the heat-affected zone.

FIG. 4 qualitatively illustrates the relationship between CeEBB and the fracture toughness values ($\delta c$) of the welded metal (WM) and the heat-affected zone (HAZ) in the electron-beam welded joint. The solid-line curve represents the fracture toughness value ($\delta cwm$) of the welded metal, and the broken-line curve represents the fracture toughness value ($\delta cha$) of the heat-affected zone. The curve illustrated in the long dashed double-short dashed line represents the fracture toughness value of the heat-affected zone (expected values of HAZ toughness) on the assumption that the effect of the hardness of the WM is ignored. Such expected values of the HAZ toughness can be measured, for example, through a fracture toughness test using a test piece subjected to a thermal treatment simulating a thermal history of the HAZ.

By using the insert metal such as a Ni foil, it is possible to increase the fracture toughness value ($\delta cwm$) of the WM to the same level as that of the base metal. With the increase in the index value CeEBB, the expected value of the HAZ toughness decreases due to the increase in the high-carbon martensite in the HAZ and the hardening of the HAZ.

Further, with the increase in the index value CeEBB, the WM hardens, which results in a reduction in the $\delta cha$ to be lower than the expected value of the HAZ toughness. Note that, in the case where the Ni foil or other foil is used, the strength deteriorates if the CeEBB is low, although the toughness is not adversely affected. Thus, it is necessary to set the lower limit value for the CeEBB.

As described above, with the index value CeEBB, it is possible to systematically evaluate the fracture toughnesses of the welded metal and the heat-affected zone. By setting the index value CeEBB in an appropriate range, it is possible to make the fracture toughness value of the heat-affected zone greater than or equal to the target value plotted with the dot-and-dash line. In the case where the pinning grain or intra-granular transformation described later is employed, the $\delta cha$ improves due to the effect of the pinning or intra-granular transformation.

Next, the present inventors made a study of a relationship between the amount of C and the index value CeEBB in the steel (base metal), and the toughnesses of the base metal, the welded metal, and the heat-affected zone. As a result, it was found that it is preferable to control the upper limit of a ratio "C/CeEBB" of the amount of C in the base metal relative to the CeEBB. The technical meaning of the ratio "C/CeEBB" will be described below.

Figure 5:
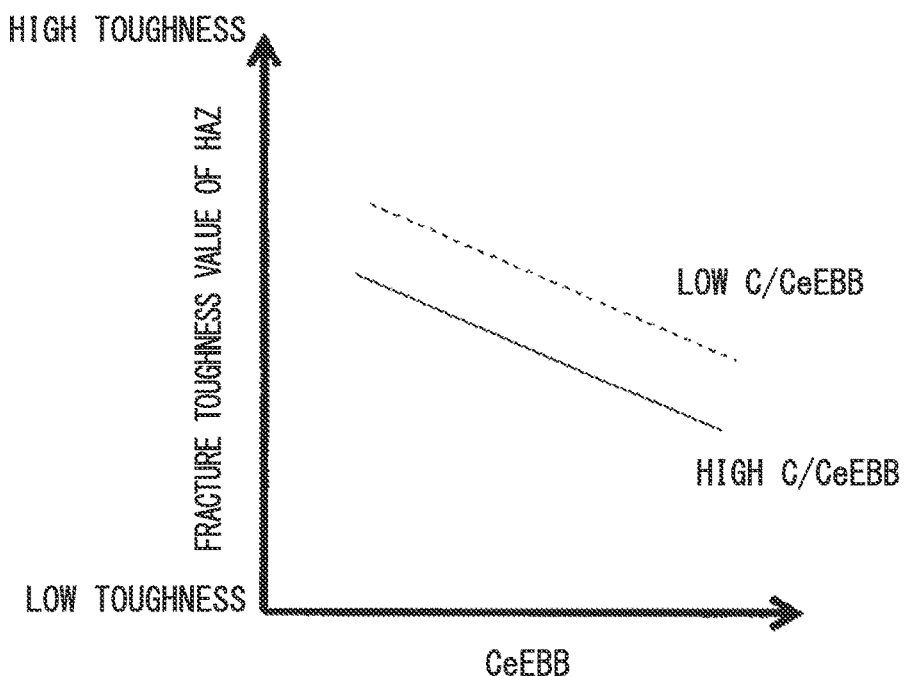
FIG. 5 is a diagram qualitatively illustrating a relationship between the fracture toughness value of the heat-affected zone and C/CeEBB.

The ratio "C/CeEBB" is an index used for preventing the hardenability of the heat-affected zone from being undesirably unbalanced. In the present invention, the insert metal is used. Thus, Ni compensates for the reduction in the hardenability of the welded metal caused by the reduction in the C/CeEBB. FIG. 5 illustrates a relationship between the CeEBB and the fracture toughness value of the heat-affected zone.

The CeEBB is an index relating to the hardenability. Thus, with the increase in CeEBB, the high-carbon martensite is more likely to be generated in the heat-affected zone, which results in a reduction in the fracture toughness value. Further, with the increase in the amount of C, the high-carbon martensite is more likely to be generated in the heat-affected zone. For these reasons, as illustrated in FIG. 5, it is preferable to limit the C/CeEBB to secure the fracture toughness value of the heat-affected zone.

The present inventors further studied appropriate components in the welded metal of the welded joint subjected to the electron-beam welding while the insert metal containing Ni was involved. Ni is added to the welded metal from the Ni-containing insert metal. Thus, it is necessary to clearly set the appropriate amount of Ni and the appropriate CeEBB to secure the toughness of the welded metal.

The present inventors further made a study of a method of improving the balance between the fracture toughness value of the welded metal and the fracture toughness value of the heat-affected zone, and obtained the following results. Since the heat-inputted amount in the electron-beam welding is low, the large amount of Ti-containing oxide grain remains. In the heat-affected zone, this Ti-containing oxide grain functions as a pinning grain that suppresses the grain growth to suppress the grain growth, and also significantly effectively functions as a product nucleus for the intra-granular transformation in the welded metal, thereby promoting the growth of the ferrite in the grain. Thus, it was found that, with these functions, the Ti-containing oxide grain improves the fracture toughnesses of the heat-affected zone and the welded metal in the electron-beam welded joint formed with the Ni-containing insert metal being involved.

Further, the present inventors performed preliminary experiments to study how the size or number of the oxide grains including the Ti-containing oxide in the steel have an effect on the fracture toughness value of the electron-beam welded joint. As described below, in the preliminary experiments, plural steels with various numbers of or sizes of oxide grains were manufactured while total oxygen amounts in the steel and cooling rates for cast pieces were changed. Using these steels, electron-beam welded joints were manufactured, and fracture toughness values thereof were measured.

In the preliminary tests, the oxide grains and the fracture toughness values were measured at the center portion in the thickness direction of each of the steel plates. This is because of the following reasons. The first reason is that, as can be understood from results of CTOD tests, the thickness center portion of the electron-beam welded joint is mechanically subjected to the highest restraining force and is more likely to become a starting point of breakage. Further, at the center portion in the thickness direction of the steel plate, the dissolved elements are more likely to be concentrated and the structure thereof is more likely to be hardened due to segregation at the time of solidification during continuous casting (centerline segregation), and from the viewpoint of metallurgy, this makes the brittle fracture more likely to occur as compared with portions close to the surface layer in the thickness direction. This is the second reason. Yet further, unlike the normal arc-welded joint, the electron-beam welded joint to which the present invention is directed has a flat fused surface extending almost parallel to the thickness direction. Thus, due to the mechanical and metallurgical effects in the thickness direction described above, the coarsened oxide grain is likely to serve as the starting point of the brittle fracture. In other words, the third reason is that the fracture toughness values of the heat-affected zone and the welded metal of the electron-beam welded joint are more susceptible to the size or number of the oxide grain existing in the thickness center portion as compared with those of the normal arc-welded joint.

Through preliminary experiments described later, the relationship between the number of oxide grains and the fracture toughness value was examined. As a result, the following findings were obtained. With an equivalent circle diameter of 0.05 µm or more, an oxide grain containing Ti of 10% or more highly efficiently provides the pinning function and promotion function for intra-granular transformation, and largely contributes to reducing the size of the crystal grain. On the other hand, the grain of the oxides (all oxides including the Ti-containing oxide) having a relatively large grain diameter may function as a starting point of occurrence of the brittle fracture. The oxide grain tends to become the starting point of the brittle fracture if the equivalent circle diameter thereof exceeds 0.5 µm, and in particular, strongly tends to serve as the starting point of the breakage if the equivalent circle diameter is 1.0 µm or more. Thus, it is desirable to limit the number of this oxide as much as possible. Additionally, it is found that, by making the steel contain an appropriate amount of Ti-containing oxide grain and having the equivalent circle diameter of not less than 0.05 µm and less than 0.5 µm, it is possible to effectively reduce the size of the crystal grain without causing a brittle fracture.

In the preliminary experiments, the oxide grains existing in the steel were categorized into two classes including: (1) oxide grain having an equivalent circle diameter of not less than 0.05 µm and less than 0.5 µm and containing Ti of 10% or more (hereinafter, also referred to as "small Ti-containing oxide"); and (2) all oxides having the equivalent circle diameter of 1.0 µm or more (hereinafter, also referred to as "coarsened oxide"), and the number of oxide grains was measured for each of the classes. Then, a quantitative study was made on a relationship between the number of oxide grains in each of the classes in the steel, and the toughness value of a joint made of the steels after the electron-beam welding.

In the preliminary experiments, cast pieces were manufactured using a small experiment furnace by setting target components by mass % including: C: 0.07%, Si: 0.06%, Mn: 2.0%, P: 0.007%, S: 0.002%, Ti: 0.009%, Al: 0.002%, and N: 0.006%. When the cast pieces were manufactured, the number of oxide in each of the classes was controlled by controlling the following steps: (i) varying a processing period of time for a vacuum degassing process applied to a molten metal to adjust the total oxygen amount in the cast piece; and (ii) adjusting the amount of cold water for cooling the cast piece during casting to control the cooling rate for the cast piece to be in the range of 1 to 30° C./min in the temperature range of 1300 to 1100° C. The components of each of the cast pieces manufactured in the preliminary experiments were almost the same as the target components described above. Further, the total oxygen amount of each of the manufactured cast pieces fell within the range of 10 to 41 ppm. By using the thus obtained cast pieces, steel plates having a thickness of 50 mm were manufactured through ACC described later.

The number of oxide grains in the steels described above was measured through the method used in Examples described later.

Figure 7:
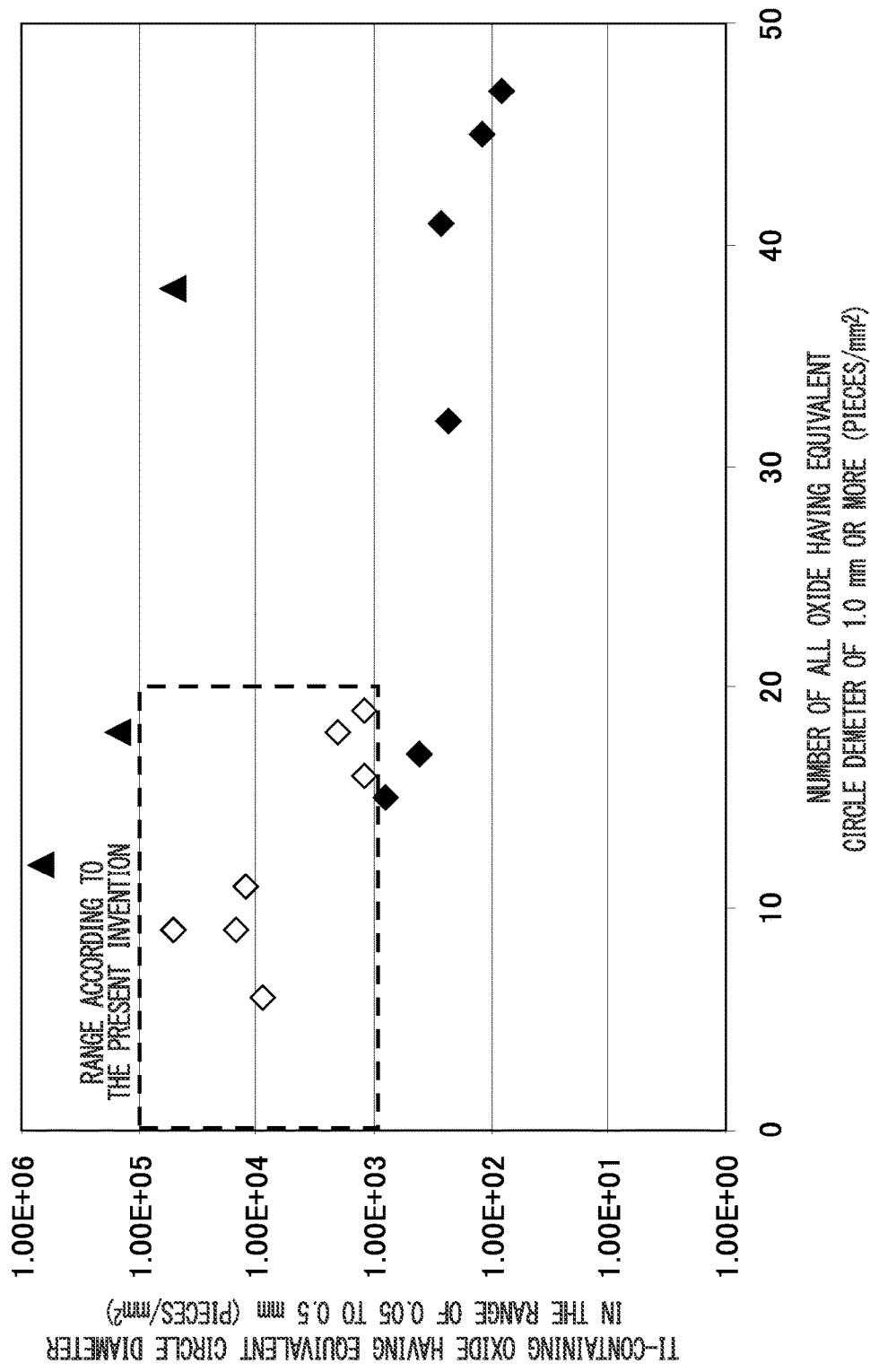
FIG. 7 is a diagram illustrating a relationship between results of a CTOD test applied to the welded joint and the number of oxide contained in the steel.
Figure 8A:
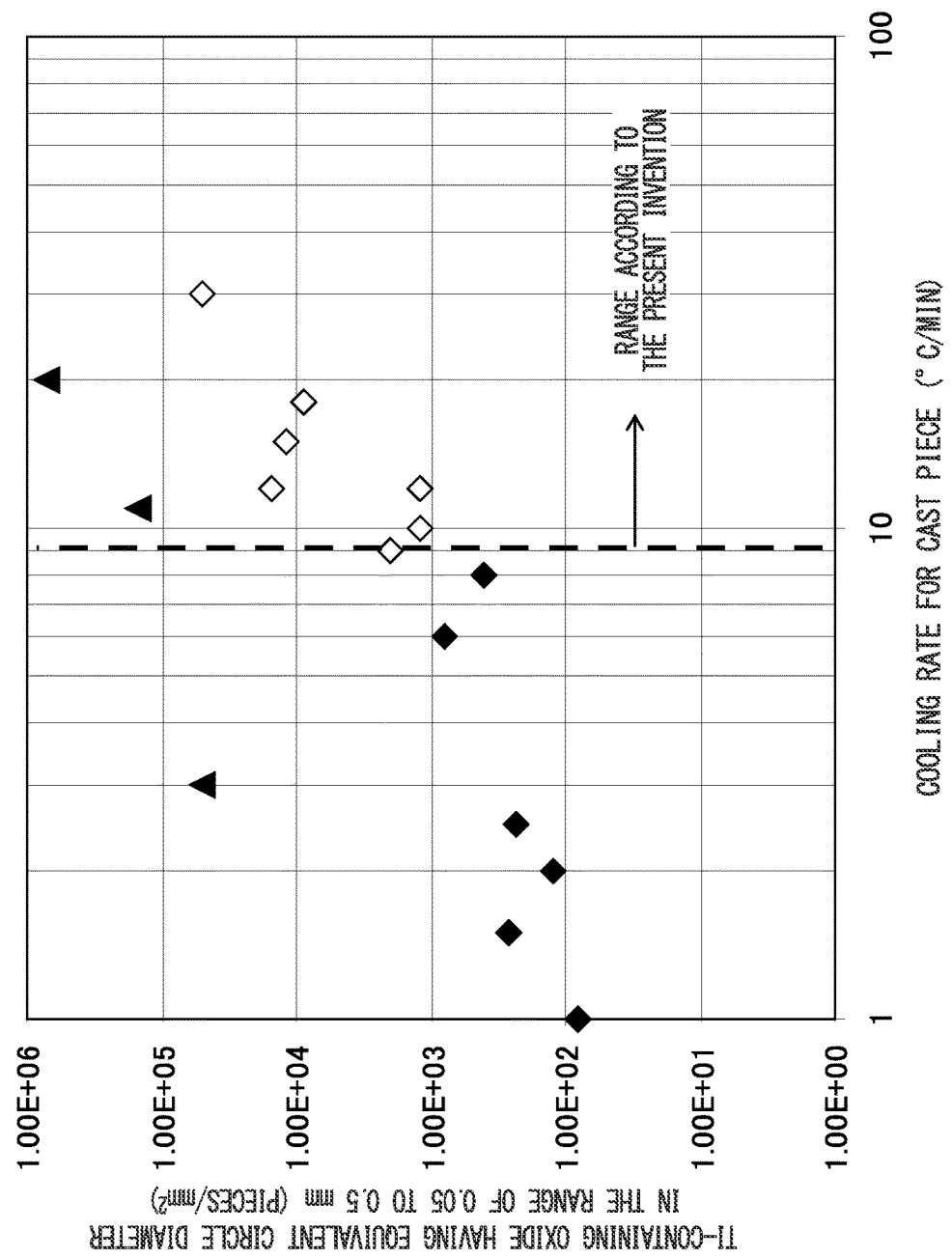
FIG. 8A is a diagram illustrating a correlation between the cooling rate for a cast piece and the number of fine Ti-containing oxide grain in the steel.
Figure 8B:
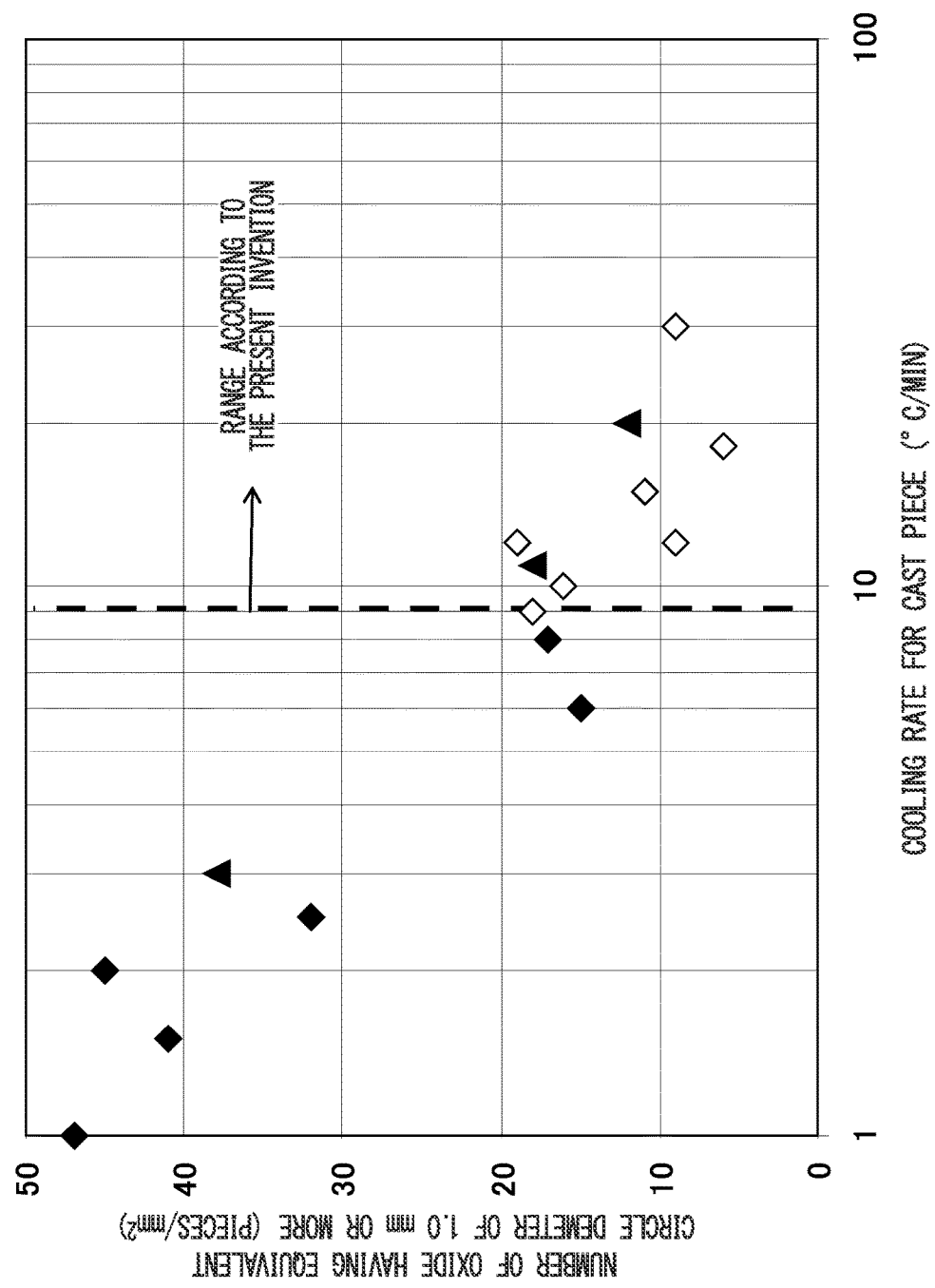
FIG. 8B is a diagram illustrating a correlation between the cooling rate for a cast piece and the number of coarsened oxide grain contained in the steel.
Figure 9:
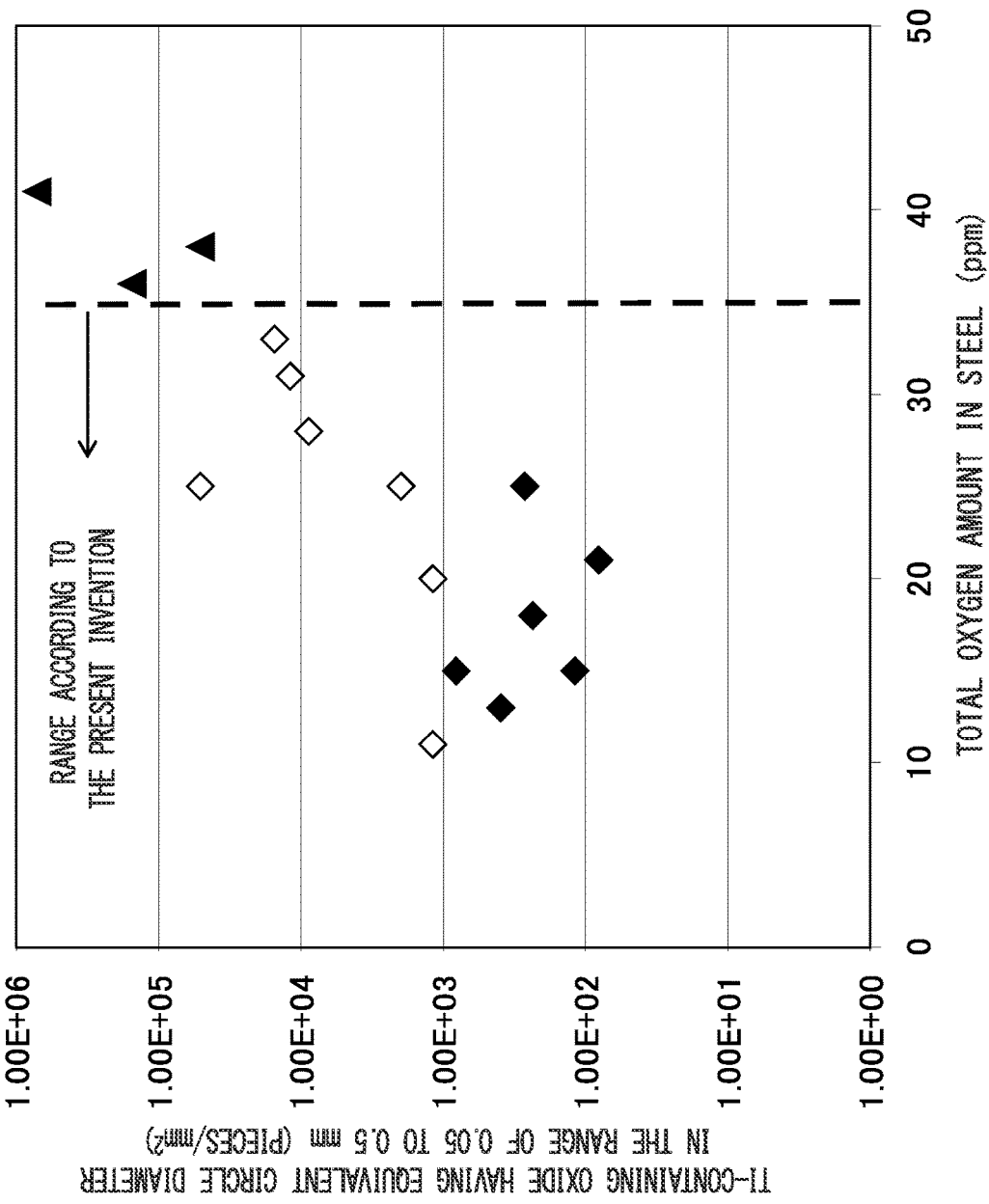
FIG. 9 is a diagram illustrating a correlation between the total oxygen amount in the steel and the number of fine Ti-containing oxide grain in the steel.

Further, electron-beam welding used in the Examples below was applied to each of these steels to manufacture an I-groove butt-welded joint, by inserting a Ni foil between groove faces so as to obtain a welded metal having an Ni concentration of 2%. Details of this welding will be described in Examples below. Test pieces for CTOD each having a notch formed at a melted portion (fusion line: FL) of the welded joint were manufactured and were subjected to CTOD tests at a test temperature of 0° C. In the case where the resulting fracture toughness value of the HAZ, which is $\delta_{HAZ}$, is 0.5 mm or more, the sample was determined to be acceptable, and the other cases were determined to be unacceptable. FIG. 7 to FIG. 9 show the results of the preliminary experiments. In FIG. 7 to FIG. 9, hollow marks represent samples determined to be acceptable in the CTOD tests, and solid marks represent samples determined to be unacceptable. Further, rhombus marks represent samples having the oxygen amount of 0.0035% or less in the steel, and triangle marks represent samples having the oxygen amount of over 0.0035%.

FIG. 7 illustrates a relationship between the results of the CTOD tests, and the numbers of the small Ti-containing oxide described above and the coarsened oxide described above. In FIG. 7, all the marks (hollow rhombus) of the welded joint determined to be acceptable in the CTOD tests fall within a squared range with a broken line indicated as "range according to the present invention." More specifically, it was found that the CTOD value $\delta_{HAZ}$ of the HAZ is 0.5 mm or more under the conditions where (1) the number of oxide having an equivalent circle diameter of 1.0 µm or more (the coarsened oxide) is 20 pieces/mm² or less at the thickness center portion of the steel, and (2) the number of oxide containing Ti of 10% or more and having an equivalent circle diameter of not less than 0.05 µm and less than 0.5 µm (the small Ti-containing oxide) is in the range of $1\times10^3$ to $1\times10^1$ pieces/mm² at the thickness center portion.

Next, a study was made of a correlation between the cooling rate for the cast pieces in the temperature range of 1300 to 1100° C. and the number of the small Ti-containing oxide grain. As illustrated in FIG. 8A, with the increase in the cooling rate, the number of the small Ti-containing oxide at the thickness center portion tends to increase. In particular, the samples (rhombus marks) having the total oxygen amount in the steel adjusted to be 0.0035% or less through a vacuum degassing process exhibit a clear tendency to an increase in the number of the oxide in relation to the cooling rate in the case where the cooling rate for the cast pieces is 9° C./min or more. As a result, within the above-described range of the total oxygen amount and the cooling rate, it was possible to control the number of the small Ti-containing oxide to be in the range of $1\times10^3$ to $1\times10^1$ pieces/mm². In FIG. 8A, this cooling rate range is indicated with the broken line and the arrow as the "range according to the present invention." Further, all the samples that satisfy the above-described range of the total oxygen amount and the cooling rate have the CTOD value $\delta_{HAZ}$ of the HAZ of 0.5 mm or more (rhombus hollow marks).

Next, a study was made of a correlation between the cooling rate for the cast pieces in the temperature range of 1300° C. to 1100° C. and the number of the coarsened oxide grain. As illustrated in FIG. 8B, with the increase in the cooling rate, the number of the coarsened oxide at the thickness center portion tends to decrease. In particular, for the samples (rhombus marks) having the total oxygen amount in the steel adjusted to be 0.0035% or less through the degassing process, the number of the coarsened Ti-containing oxide was 20 pieces/mm² or less in the case where the cooling rate for the cast pieces is 9° C./min or more. In FIG. 8B, this cooling rate range is indicated with the broken line and the arrow as the "range according to the present invention."

Next, a study was made of a correlation between the total oxygen amount in the steel and the number of the small Ti-containing oxide grain. As illustrated in FIG. 9, with the increase in the total oxygen amount, the number of the small Ti-containing oxide grain at the thickness center portion tends to increase. In the case where the total oxygen amount exceeds 0.0035%, there is a possibility that the number of the small Ti-containing oxide grain cannot be controlled to be $1\times10^5$ pieces/mm² or less even if the cooling rate of the cast piece is set to 9° C./min or more. In this case, it is considered that the excessive oxide grains serve as the starting point of the brittle fracture, deteriorating the CTOD test values. In FIG. 9, the range of the total oxygen amount of 0.0035% (35 ppm) or less is indicated with the broken line and the arrow as the "range according to the present invention." Within this oxygen amount range, all the samples with the cooling rate for the cast pieces set to 9° C./min or more show the $\delta_{HAZ}$ value of 0.5 mm or more (rhombus hollow marks).

Based on all the results of the preliminary experiments, the present inventors obtained the following findings. It is possible to improve the fracture toughness of the heat-affected zone and the welded metal of the electron-beam welded joint, by (1) reducing the coarsened oxide grain existing at the thickness center portion, and (2) appropriately controlling the number of the small Ti-containing oxide grain serving as the nucleus for the intra-granular transformation. Further, it was found that, in order to control the size of or the number of the oxide grain, it is effective to (3) control the total oxygen concentration in the steel to be in the appropriate range, and (4) control the cooling rate for the steel during casting to be in the appropriate range. Note that it is considered that the required cooling rate for the cast pieces of 9° C./min, which can be obtained through the preliminary experiments, may vary depending, for example, on ladle refinement equipment of a steel-making factory that melts, manufactures or casts the steel, or conditions of casting equipment (for example, degree of vacuum of the vacuum degassing, and shapes of weir for casting). Thus, in order to improve the CTOD test results, it is only necessary to obtain a predetermined number of the oxide in a predetermined component range, and it is not always necessary to limit the cooling rate during casting to 9° C./min or more.

Based on the results of the preliminary experiments described above, according to the present invention, the amount of C and the amount of O in the base metal, the CeEBB, the C/CeEBB, and the size of and the number of oxide grain are controlled to be in the appropriate range, the amount of Al is reduced, and the appropriate amount of Ti is added. Further, this base metal is used and the insert metal containing Ni is involved to form the electron-beam welded joint. As a result, during welding, the fine Ti-containing oxide functions as the pinning grain and the product nucleus for intra-granular transformation, making a ratio of the fracture toughness values of the welded metal and the heat-affected zone relative to the fracture toughness value of the base metal fall within the appropriate range, whereby it is possible to minimize the variation in the fracture toughness value δc.

The steel according to this embodiment of the present invention contains, by mass %, at least C: 0.02% to 0.10%, Si: 0.03% to 0.30%, Mn: 1.5% to 2.5%, Ti: 0.005% to 0.015%, N: 0.0020% to 0.0060%, and O: 0.0010% to 0.0035%. Of inevitable impurities contained in the steel, it is required to limit S: 0.010% or less, P: 0.015% or less, and Al: 0.004% or less. Further, the steel may contain Nb: 0% to 0.020%, V: 0% to 0.030%, Cr: 0% to 0.50%, Mo: 0% to 0.50%, Cu: 0% to 0.25%, Ni: 0% to 0.50%, and B: 0% to 0.0030% depending on applications. The rest of the composition of the steel described above includes iron and inevitable impurities.

In the case where the electron-beam welding is applied using the steel described above in a state where the insert metal containing Ni is inserted between groove surfaces, Mn and O reduce and Ni increases in the welded metal. As a result, the welded metal contains, by mass %, at least C: 0.02% to 0.10%, Si: 0.03% to 0.30%, Mn: 1.2% to 2.4%, Ni: 1.0% to 2.3%, Ti: 0.005% to 0.015%, N: 0.0020% to 0.0060%, and O: 0.0004% to 0.0020%. Further, of the inevitable impurities contained in the composition of the welded metal described above, it is required to limit S: 0.010% or less, P: 0.015% or less, and Al: 0.004% or less. Further, the welded metal described above may contain Nb: 0% to 0.020%, V: 0% to 0.030%, Cr: 0% to 0.50%, Mo: 0% to 0.50%, Cu: 0% to 0.25%, and B: 0% to 0.0030% depending on applications. The rest of the composition of the welded metal described above includes iron and inevitable impurities.

Next, the reason for adding the elements, and the amount of the elements added will be described. Note that the unit "%" means mass %.

C is an element that contributes to improving the strength. In order to secure the strength necessary for the welded structure, C of 0.02% or more is added. The lower limit of the amount of C is set preferably to 0.03%, more preferably to 0.04%. On the other hand, in the case where the amount of C exceeds 0.10%, the hardenability excessively increases and the toughness deteriorates. Thus, the upper limit of the amount of C is set to 0.10% or less. The upper limit is set preferably to 0.08% or 0.07%, and more preferably to 0.06%.

Si is a deoxidation element, and is effective in securing the strength of the steel plate. Thus, Si of 0.03% or more is added. However, the excessively large amount of Si added leads to generation of the large amount of island martensite, particularly deteriorating the toughness of the welded metal and the heat-affected zone. For this reason, the upper limit of the amount of Si is set to 0.30%. The upper limit of the amount of Si is preferably to 0.25% or 0.20%, more preferably to 0.15%.

Mn is effective in securing the toughness and enhancing the hardenability to secure the strength of the steel plate. In the case where the amount of Mn is less than 1.5%, it is not possible to sufficiently obtain the toughness, strength, and hardenability of the steel. Further, Mn partially disappears during the electron-beam welding due to evaporation from the welded metal. Thus, in order to secure the toughness, strength and hardenability of the steel, and the hardenability of the welded metal, Mn of 1.5% or more is added.

The lower limit of the amount of Mn is set preferably to 1.6% or 1.7%, more preferably to 1.8%. In the case where the amount of Mn exceeds 2.5%, the hardenability excessively increases, and in particular, the toughness of the heat-affected zone reduces. For this reason, the upper limit of the amount of Mn is set to 2.5%. The upper limit is set preferably to 2.4%, more preferably to 2.3%.

P is an inevitable impurity, and has an adverse effect on the toughness of the base metal (BM), the welded metal (WM), and the heat-affected zone (HAZ). In particular, in order to secure the toughness of the heat-affected zone (HAZ), it is preferable to reduce the amount of P, and the amount of P is limited to 0.015% or less. It is preferable to set the amount of P to 0.010% or less, or 0.006% or less. It is not necessary to particularly set the lower limit of the amount of P, and the lower limit of the amount of P is 0%. However, from the viewpoint of the manufacturing cost, the extremely low amount of P of less than 0.001% is not necessary. The amount of P may be set to 0.001% or more.

S is an inevitable impurity, and forms MnS. MnS employs fine Ti-containing oxide grain as a nucleus to precipitate, and forms Mn-poor area. This facilitates generation of the intra-granular ferrite (intra-granular transformation). In order to facilitate the intra-granular transformation, it is preferable to contain S of 0.0001% or more. The lower limit of the amount of S is set preferably to 0.001%. Depending on applications, the lower limit of the amount of S may be set to 0.002%. The lower limit of the amount of S may not be set, and it may be possible to set the lower limit to 0%. The excessively large amount of S contained particularly leads to a reduction in the toughness of the heat-affected zone (HAZ). Thus, the amount of S is limited to 0.010% or less. The upper limit of the amount of S is set preferably to 0.007%, or 0.005%.

Al is a strong deoxidation element and suppresses generation of the Ti-containing oxide grain. Thus, it is necessary to limit the amount of Al added. In the embodiment according to the present invention, the amount of Al is limited to 0.004% or less to facilitate generation of the Ti-containing oxide grain. The upper limit of the amount of Al may be limited to 0.003% or 0.0025% depending on applications. The lower the amount of Al is, the more preferable it is. Hence, it is not necessary to set the lower limit of the amount of Al, and the lower limit of the amount of Al is set to to 0%. However, in the case where Al is used as the deoxidation element to reduce the amount of O prior to addition of Ti to the molten steel, it is preferable to add Al of 0.0005% or more, or 0.001% or more.

Ti is an extremely important element in the present invention, and is used for deoxidizing the steel. Ti of 0.005% or more is added to form, in the heat-affected zone (HAZ), the Ti-containing oxide grain that functions as the product nucleus for the intra-granular transformation during welding, thereby improving the toughness. It is preferable to set the amount of Ti to 0.007% or more. However, the excessively large amount of Ti leads to generation of the coarsened TiN, deteriorating the toughness. Thus, the upper limit thereof is set to 0.015%, preferably to 0.012%.

N is an element that combines with Ti to form TiN that has a function of suppressing coarsening of the crystal grain. N is added with the amount of 0.0020% or more to suppress coarsening of the crystal grain. Preferably, the lower limit of the amount of N is 0.0030%. However, the excessively large amount of N has an adverse effect particularly on the toughness of the heat-affected zone, and hence, the upper limit of the amount of N is set to 0.0060%. The upper limit of the amount of N is set preferably to 0.0050%.

O combines with Ti to form the Ti-containing oxide grain that functions as the product nucleus at the time of intra-granular transformation, and particularly has an effect of improving the toughness of the heat-affected zone (HAZ). In the case where the amount O is excessively low, the above-described effect cannot be sufficiently obtained. Thus, the lower limit is set to 0.0010%. The amount of O in the welded metal of the electron-beam welded joint is lower than that in the base metal. Thus, the lower limit of the amount of O is set preferably to 0.0015%, more preferably to 0.0020%. On the other hand, the excessively large amount of O leads to excessive generation of the oxide serving as the starting point of the brittle fracture, having an adverse effect on the toughness of the base metal and the heat-affected zone. Thus, the upper limit of the amount of O in the steel is set to 0.0035%. In the case where oxide is more likely to be excessively generated in the steel due to the conditions such as composition and manufacturing processes, it may be possible to set the upper limit of the amount of O to 0.0032%, 0.0029%, or 0.0025%.

It should be noted that, if the electron-beam welding is applied under normal conditions according to this embodiment of the present invention, approximately half of the amount of O in the steel is more likely to dissipate from the welded metal through the welding process. For this reason, in the case where the amount of O in the steel is set to 0.0035% or less, the amount of O in the welded metal is more likely to be approximately 0.0020% or less in the joint after welding.

For the steel according to this embodiment of the present invention, it is not necessary to add Mg or Ca, and it may be possible to limit each of the amount of Mg and the amount of Ca in the inevitable impurities to 0.0002% or less.

The steel according to this embodiment of the present invention may contain a certain range of Nb and/or V for the reason described below.

Nb is an element effective in improving the hardenability of the base metal, and enhancing the strength thereof. Adding Nb is not essential, but Nb may be added depending on applications. In order to obtain the adding effect, Nb of 0.001% or more, preferably Nb of 0.003% or more is added. However, the excessive addition of Nb leads to a reduction particularly in the toughness of the heat-affected zone (HAZ). Thus, the upper limit of the amount of Nb is set to 0.020%, preferably to 0.012%, more preferably to 0.010%. It is not necessary to particularly set the lower limit of Nb, and the amount of Nb may be 0%.

The small amount of V added provides an effect of enhancing the hardenability and the resistance to temper softening. Addition of V is not essential, and V may be added as needed. In order to obtain these effects, V of 0.005% or more is added, and preferably, V of 0.010% or more is added. However, the excessively large amount of V added particularly leads to a reduction in the toughness of the heat-affected zone (HAZ). Thus, the upper limit of the amount of V is set to 0.030%. The upper limit of the amount of V is set preferably to 0.025%, more preferably to 0.020%. It is not necessary to particularly set the lower limit of V, and the amount of V may be 0%.

The steel according to this embodiment of the present invention may further contain one or more elements of Cr, Mo, Cu, Ni, and B depending on applications. Adding these elements is not essential, but is effective in improving the toughness and the strength. In order to obtain these effects, one or more elements of Cr, Mo, Cu, and Ni is each added in an amount of 0.05% or more.

The small amount of B added makes the hardenability significantly improve. Thus, B may be added in an amount of 0.0030% at the maximum, depending on applications, for example, in the case where it is difficult to secure a cooling rate. In order to obtain the effect of improving the hardenability, B of 0.0002% or more is added.

However, Cr, Mo, Cu, and Ni are expensive elements. Thus, from the economical viewpoint, the amount of these elements are set to Cr: 0.50% or less, Mo: 0.50% or less, Cu: 0.25% or less, and Ni: 0.50% or less. In particular, in the case where the excessive amount of these elements are added to the steel according to this embodiment of the present invention containing increased amount of Mn, the hardenability undesirably increases, possibly deteriorating the balance of the toughness. Thus, preferably, the total amount of Cr, Mo, Cu, and/or Ni is set to 0.70% or less, and more preferably, the total amount of these elements is set to 0.50% or less. This total amount may be limited to 0.40%, 0.30%, or 0.20% depending on applications. In order to avoid cracking of the steel resulting from addition of B, it may be possible to set the upper limit of the amount of B to 0.0020%, 0.0017%, or 0.0014%. It is not necessary to particularly set the lower limit of Cr, Mo, Cu, Ni, and B, and the amount of each of the elements added may be 0%.

In the case where the electron-beam welding is applied to the steel according to this embodiment of the present invention, the amount of Mn and the amount of O in the welded metal are lower than those in the base metal. This is because Mn partially evaporates from the welded metal during application of the electron-beam welding in a vacuum state, and oxide floats to the surface and is discharged from the welded metal. Thus, the amount of Mn and the amount of O in the welded metal are set to Mn: 1.2% to 2.4% and O: 0.0004% to 0.0020% by mass %, respectively. The lower limit of the amount of Mn in the welded metal may be set to 1.4% or 1.6%, and the upper limit of the amount of Mn therein may be set to 2.0% or 1.8%. The lower limit of the amount of O in the welded metal may be set to 0.0010% or 0.0014%, and the upper limit of the amount of O therein may be 0.0019% or 0.0018%.

When the electron-beam welded joint is formed using the steel according to the present invention, the insert metal containing Ni is inserted between the groove faces of the weld target portion (groove butted portion) to add Ni to the welded portion, thereby enhancing the toughness of the welded metal. In order to significantly enhance the toughness of the welded metal, and preferably make the fracture toughness value of the welded metal 0.8 times or more that of the base metal, it is necessary to set the amount of Ni to 1.0% or more in the welded metal. The lower limit of the amount of Ni in the welded metal may be set to 1.3% or 1.6%.

On the other hand, the excessively large amount of Ni increases the hardness of the welded metal, adversely affecting the fracture toughness of the heat-affected zone. In particular, to secure the toughness of the heat-affected zone, the upper limit of the amount of Ni is set to 2.3% or less. Note that the excessively large amount of Ni in the welded metal renders a high-carbon martensite more likely to be generated, increasing hardness of the welded metal and possibly reducing the fracture toughness. The upper limit of the amount of Ni in the welded metal may be set to 2.2% or 2.0%.

In the case where the amount of Ti added to enhance the toughness of the welded metal resulting from the pinning effect is low, it is preferable to increase the amount of Ni in the welded metal. It may be possible to use Ni alloy or pure Ni as the insert metal. Use of the pure Ni contributes to simplification.

According to the electron-beam welded joint of this embodiment of the present invention, the components of the steel (base metal) are substituted into the following Formula 1 to obtain the index value CeEBB, and the index value CeEBB is set to be in the range of 0.42 to 0.65%. According to the steel of this embodiment of the present invention, the components of this steel are substituted into the following Formula 1 to obtain the index value CeEBB, and the index value CeEBB is set to be in the range of 0.42 to 0.65%. Note that the unit % represents mass %.

$$CeEBB = C + \tfrac{1}{4}Mn + \tfrac{1}{15}Cu + \tfrac{1}{15}Ni + \tfrac{1}{5}Cr + \tfrac{1}{5}Mo + \tfrac{1}{5}V \quad \text{(Formula 1)}$$

In this Formula, C, Mn, Cu, Ni, Cr, Mo, and V represent the amount of the elements (mass %) contained in the steel. The unit for the CeEBB value is mass %.

Formula 1 for obtaining an index CeEBB of hardenability of the electron-beam welding is created by taking it into consideration that the welded metal of the electron-beam welded joint formed by inserting the insert metal containing Ni between the groove surfaces of the weld target portion contains Ni in an amount of 1.0 to 2.3%.

The lower limit of the index value CeEBB of hardenability after electron-beam welding of the base metal is set to 0.42% to secure the strength of the base metal. The CeEBB may be set preferably to 0.45% or more, more preferably to 0.48% or more. In the case where the CeEBB exceeds 0.65%, the fracture toughness of the heat-affected zone becomes insufficient. Thus, the upper limit of the CeEBB is set to 0.65%. The upper limit of the CeEBB may be set preferably to 0.60%, more preferably to 0.58%.

According to the steel of this embodiment of the present invention, the number of the oxide having an equivalent circle diameter of 1.0 μm or more (coarsened oxide grain) is set to 20 pieces/mm² or less at a thickness center portion in cross section along the thickness direction of the steel. Further, at the same thickness center portion, the number of oxide containing Ti of 10% or more and the equivalent circle diameter of not less than 0.05 μm and less than 0.5 μm (small Ti-containing oxide) is set to be in the range of $1\times10^3$ to $1\times10^5$ pieces/mm². In the case where the number of the coarsened oxide grain exceeds 20 pieces/mm², the oxide grain serves as the starting point of breakage, which results in insufficient fracture toughness of the heat-affected zone and the welded metal. In the case where the number of the small Ti-containing oxide is less than $1\times10^3$, sufficient pinning effect or effect of promoting the intra-granular transformation resulting from the Ti-containing oxide cannot be obtained, which adversely affects the toughness of the heat-affected zone and the welded metal. In the case where the number of the small Ti-containing oxide exceeds $1\times10^5$, the excessive Ti-containing oxide grains are more likely to serve as the starting point of breakage, which results in insufficient fracture toughness of the heat-affected zone and the welded metal.

It should be noted that, for example, the number of the coarsened oxide is measured on cross-sectional test pieces taken from the center portion along the thickness direction of the steel with a field emission scanning electron microscope (FE-SEM).

Further, the number of the small Ti-containing oxide is measured on cross-sectional test pieces taken from the center portion along the thickness direction of the steel plate with a field emission transmission electron microscope (FE-TEM). Further, an extraction-replica film is created and observed with a TEM, and grains having Ti of 10% or more by weight ratio measured through an EDX method (energy dispersive x-ray spectrometry) are determined to be the oxide containing Ti of 10% or more.

The ratio (C/CeEBB) of the amount of C of the base metal relative to the index CeEBB of hardenability after electron-beam welding of the base metal is an index indicating balance between the hardenability of the welded metal and the hardenability of the heat-affected zone and the base metal. Preferably, the C/CeEBB takes a value of 0.15 or less. In the case where the amount of C becomes excessive relative to the amount of Mn, Cu, Ni, Cr, Mo, and/or V, and the C/CeEBB exceeds 0.15, the fracture toughness of the heat-affected zone may deteriorate. The upper limit of the C/CeEBB is set preferably to 0.13, more preferably to 0.11.

In the case where the electron-beam welding is applied while the insert metal containing Ni is inserted between the groove faces of the weld portion, Ni compensates for the reduction in the hardenability of the welded metal caused by the reduction in the C/CeEBB of the base metal. Thus, the lower limit of the C/CeEBB is not set. However, the C/CeEBB substantially takes the minimum value in the case where the amount of C is the lower limit value and the amount of Mn, Cu, Ni, Cr, Mo, and V is the upper limit value. Thus, the lowest limit value of the C/CeEBB is 0.02 in the present invention.

It should be noted that the cost of alloying can be reduced by increasing the amount of C and reducing the amount of Cu, Ni, Cr, Mo, and/or V. Thus, the lower limit of the C/CeEBB is set more preferably to 0.04 or more, much more preferably to 0.06 or more.

According to the electron-beam welded joint formed while the insert metal containing Ni is inserted between the groove faces of the weld portion, the index value CeEBW of the hardenability of the welded metal obtained on the basis of the following Formula 2 is set to be in the range of 0.56 to 0.73%. The CeEBW of the welded metal is set to 0.56% or more to secure the hardenability of the welded metal. The lower limit of the CeEBW of the welded metal is set more preferably to 0.60%. In the case where the CeEBW of the welded metal exceeds 0.73%, the welded metal hardens, which results in insufficient fracture toughness of the welded joint. The upper limit of the CeEBW of the welded metal is set more preferably to 0.70%.

Preferably, the welded joint formed through the electron-beam welding by using the steel according to this embodiment of the present invention has the CTOD value $\delta_{WM}$ of the welded metal, the CTOD value $\delta_{HAZ}$ of the heat-affected zone, and the CTOD value $\delta_{BM}$ of the steel that satisfy the following Formula 3 and Formula 4.

$$0.8 \leq \delta_{BM}/\delta_{WM} \leq 1.25 \quad \text{(Formula 3)}$$

$$0.5 \leq \delta_{HAZ}/\delta_{WM} \leq 1.1 \quad \text{(Formula 4)}$$

In these formulae, the $\delta_{WM}$, the $\delta_{HAZ}$, and the $\delta_{BM}$ are the minimum values of the CTOD values obtained from three-points-bending CTOD tests performed six times at 0° C. In the case where the CTOD value is 1.0 mm or more, ductile failure was considered to occur, and the above-described calculation was performed by setting the CTOD value to 1.0 mm.

In the case where the $\delta_{BM}/\delta_{WM}$ is less than 0.8 and/or the $\delta_{HAZ}/\delta_{WM}$ is less than 0.5, the balance between the $\delta_{BM}$, the $\delta_{WM}$ and the $\delta_{HAZ}$ extremely deteriorates, and the fracture toughness of the welded portion largely deteriorates. Thus, the lower limit of the $\delta_{BM}/\delta_{WM}$ is set to 0.8, and the lower limit of the $\delta_{HAZ}/\delta_{WM}$ is set to 0.5. The lower limit of the $\delta_{HAZ}/\delta_{WM}$ is set preferably to 0.6, more preferably 0.7, further preferably to 0.8. The upper limit of the $\delta_{BM}/\delta_{WM}$ is set to 1.25 or less since the $\delta_{WM}$ is preferably 0.8 times or more of the $\delta_{BM}$.

It is preferable that the $\delta_{WM}$ and the $\delta_{BM}$ are almost equal, and the preferable upper limit of the $\delta_{BM}/\delta_{WM}$ is 1.1. Similarly, it is preferable that the $\delta_{HAZ}$ and the $\delta_{WM}$ are almost equal, and the upper limit of the $\delta_{HAZ}/\delta_{WM}$ is set to 1.1 or less. The intra-granular transformation that employs the fine Ti-containing oxide grain is extremely effective in obtaining fine HAZ structure, and by applying the electron-beam welding to the steel according to the present invention, it is possible to significantly increase the fracture toughness of the HAZ of the welded joint.

In other words, according to the steel of this embodiment of the present invention, it is possible to significantly suppress the deterioration in the fracture toughness of the welded metal and the heat-affected zone of the welded joint after the electron-beam welding as compared with the fracture toughness of the base metal, and obtain the welded joint having appropriately balanced fracture toughness between the portions thereof.

The electron-beam welding can be applied under a low-degree vacuum state which even simple equipment can create, for example, under a reduced pressure of 10 Pa or less. Depending on ability of equipment, the lower limit of the degree of vacuum is set preferably to $10^{-2}$ Pa. Welding conditions are determined according to ability of devices or thickness of steels within ranges in which the accelerating voltage falls in the range of 130 V to 180 V, the beam current falls in the range of 100 mA to 130 mA, and the welding speed falls in the range of 100 mm/min to 250 mm/min. For example, in the case where the thickness is 80 mm, it is recommended to employ the accelerating voltage of 175 V, the beam current of 120 mA, and the welding speed of approximately 125 mm/min.

At the time of application of the electron-beam welding, the insert metal containing Ni is inserted between the groove faces of the weld target portion. It may be possible to use, as the insert metal containing Ni, an Ni-based alloy foil, an Ni—Fe alloy foil, and a pure Ni foil. By using the Ni foil, it is possible to simplify a calculation of the thickness of the insert metal necessary for obtaining the targeted amount of Ni based on the amount of Ni in the steel, the amount of Ni in the targeted welded metal, the size of the steel, and the width of the welded metal. The pure Ni foil may be obtained from a foil having the necessary thickness, or may be obtained by laminating multiple thin foils so as to obtain the necessary thickness. For example, in the case where a welded joint having a welded metal with the amount of Ni of 2% is obtained using a steel (base metal) with the amount of Ni of 0%, the width of the welded metal after electron-beam welding is first examined through a preliminary experiment or other manner. Then, if the width of the welded metal is found to be 4.0 mm, it is possible to obtain an electron-beam welded joint having the welded metal with the amount of Ni of approximately 2%, by applying the electron-beam welding while inserting a Ni foil with a thickness of 0.08 mm.

Next, a description will be made of a method of manufacturing the steel according to the present invention. With the method according to the present invention, it is possible to limit the number of the coarsened oxide to 20 pieces/mm$^2$ or less, by cooling, for example, at a rate of 9° C./min or more in a casting process for casting a slab (steel piece) or other steels. At the same time, it is possible to obtain the number of the small Ti-containing oxide of $1 \times 10^3$ or more.

From the industrial viewpoint, the continuous casting is preferable as the method of manufacturing the steel (steel piece). With the continuous casting, it is possible to increase the cooling rate after casting to reduce the size of the generated oxide and Ti nitrides. Thus, from the viewpoint of improving toughness, the continuous casting is preferable.

The cooling rate for the cast piece in the continuous casting can be increased to 9° C./min or more, for example, by increasing pressure and the volume of water for a cooling area in the continuous casting device, or reducing the thickness of a casting mold, or pressing down a non-coagulated layer of a cast-piece to reduce the thickness of a slab. In general, with these methods, the upper limit of the cooling rate for the cast piece is approximately 30° C./min.

In general, the high-Mn steel has poor hot-working property as compared with a carbon steel or low-alloy steel, and hence, it is necessary to apply a thermo-mechanical treatment under appropriate conditions. In the method according to the present invention, the steel (steel piece) having the components described above and subjected to casting is heated to a temperature in the range of 950° C. to 1150° C. In the case where heating temperature is less than 950° C., deformation resistance during hot rolling increases, and productivity deteriorates. On the other hand, in the case where the temperature exceeds 1150° C., Ti nitrides in the steel (steel piece) coarsens, which possibly leads to a reduction in toughness of the steel (base metal) and the heat-affected zone.

To obtain the required strength and toughness of the steel after the steel (steel piece) is heated to a temperature in the range of 950° C. to 1150° C., a thermo-mechanical treatment (thermo-mechanical controlled processing: TMCP) is applied. The thermo-mechanical treatment is effective in enhancing the strength and toughness of the steel, and includes, for example, (I) controlled rolling (CR), (2) controlled rolling—accelerated cooling (ACC), and (3) direct quenching after rolling—tempering process (direct quenching and tempering: DQT). In the present invention, (2) controlled rolling—accelerated cooling and (3) direct hardening after rolling—tempering process are preferable from the viewpoint of improving the fracture toughness.

In a non-recrystallized temperature range (approximately 900° C. or less), the controlled rolling is effective in obtaining the fine structure of the steel and improving the strength and toughness. In the present invention, it is preferable to finish the controlled rolling at a temperature greater than or equal to an $Ar_3$ transformation point to prevent generation of deformed ferrite.

In particular, in the case where the controlled rolling is applied and then the accelerated cooling is performed, a hardened phase such as bainite and martensite is generated, which leads to an improvement in the strength. In order to secure the strength and the toughness, it is preferable to set a temperature at the time of the end of the accelerated cooling to be in the range of 400 to 600° C. The direct quenching after rolling is a method including performing hot rolling in a temperature range higher than that for the controlled rolling, and then performing water cooling to apply quenching. With this method, the strength generally increases, and hence, tempering is applied to secure the toughness. It is preferable to set the tempering temperature to be in the range of 400 to 650° C.

EXAMPLES

Next, Examples according to the present invention will be described. Conditions for Examples are merely examples of conditions used for checking applicability and effects of the present invention, and conditions in connection with the present invention are not limited to these examples of conditions. Further, various conditions may be employed in the present invention within the scope of the present invention, provided that the objective of the present invention can be achieved.

Steels were manufactured using steels containing the components shown in Table 1 and Table 2 under conditions shown in Table 3 and Table 4. Test pieces were taken from the steels, and were subjected to tensile tests and CTOD tests, and the tensile strength and the fracture toughness values of the base metal were measured on the test pieces. For the strength of the base metal, test pieces were taken from a thickness ½ portion with a rolling direction being in the longitudinal direction, and measurement was performed on the basis of JIS Z 2241.

An electron-beam welding was applied to the steels to form I-groove butt-welded joints. The RPEBW method was employed for the electron-beam welding under conditions in which a pure Ni foil was used as the insert metal, and the welding was performed under a vacuum state with approximately 1 mbar, voltage of 175 V, electric current of 120 mA, and welding speed of approximately 125 mm/min. The width of welding bead was in the range of 3.0 to 5.5 mm. Test samples were taken out from the welded metals, and components of the test samples were analyzed. Table 5 and Table 6 each show the results of the analysis.

Figure 6:
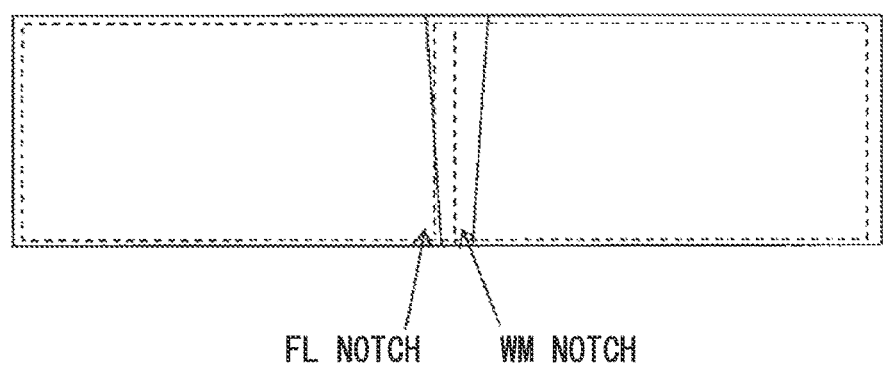
FIG. 6 is a diagram illustrating a test piece having a notch.

Further, from the welded joint, (a) six test pieces having a size of t (thickness)×2t were taken in the case where the thickness is less than 60 mm, whereas (b) six test pieces having a size of t (thickness)×t were taken in the case where the thickness is 60 mm or more. 50% fatigue crack was provided to each of the test pieces as a notch at the melted portion (FL), the base metal (BM), and the central portion of the welded metal (WM). FIG. 6 shows a test piece having the notch applied thereto.

CTOD tests were performed at a test temperature of 0° C. to obtain fracture toughness values δc. For the test pieces having the CTOD value of 1.0 or more, ductile failure was determined to occur, and the above-described calculation was made on the assumption that the CTOD value was 1.0. The lowest value of the fracture toughness values δc of the six test pieces at the notch positions were denoted by fracture toughness values $\delta_{WM}$, $\delta_{HAZ}$, and $\delta_{BM}$, respectively. Note that, since the width of the heat-affected zone of the electron-beam welded joint is narrow, the CTOD value $\delta_{HAZ}$ of the heat-affected zone was measured by using test pieces having a notch provided at the welded metal.

Table 7 and Table 8 show $\delta_{BM}/\delta_{WM}$ and $\delta_{HAZ}/\delta_{WM}$ based on the CTOD value $\delta_{WM}$ of the welded metal (WM), the CTOD value $\delta_{HAZ}$ of the heat-affected zone (HAZ), and the CTOD value $\delta_{BM}$ of the base metal (BM) of the welded joint.

The number of oxide grain in the steel was measured through the following method. Cross-sectional test pieces taken from the center portion in the thickness direction were prepared from each of the steels. Oxides (coarsened oxide) having the equivalent circle diameter of 1.0 μm or more were observed with a field emission scanning electron microscope (FE-SEM), and the size of and the number of the oxide grains were measured. Similarly, for the oxides having the equivalent circle diameter of not less than 0.05 μm and less than 0.5 μm (small Ti-containing oxide), test pieces were taken from the center portion in the thickness direction, and were subjected to electro polishing through selective potentiostatic etching by electrolytic dissolution (SPEED method). Then, from the test pieces, extraction-replica films were created, and were observed with a field emission transmission electron microscope (FE-TEM) with a magnification in the range of 10000 to 1000000 power. With an energy dispersive x-ray spectrometry (EDX method), oxides having a weight ratio of Ti of 10% or more obtained from characteristic X-rays were determined to be the Ti-containing oxide. Based on the results described above, the size of and the number of the Ti-containing oxide were measured. At the center portion in the thickness direction of each of the test pieces, 20 or more views were observed, and the average value of the number of oxide grains (the small Ti-containing oxide and the coarsened oxide) per unit area was calculated.

[Table 1]

Blank columns indicate that no alloying element was intentionally added.

[Table 2]

Underlines were applied to indicate that underlined values fall outside the range according to the present invention, or outside the favorable range. Blank columns indicate that no alloying element was intentionally added.

In following Table 3 and Table 4, words written in the columns of the thermo-mechanical treatment indicate the followings:

CR: controlled rolling (rolling at temperatures suitable for enhancing the strength and toughness), ACC: accelerated cooling (water cooling to the temperature range of 400° C. to 600° C. after controlled rolling), and DQT: quenching-tempering process applied immediately after rolling.

In the case where the toughness value (CTOD value) was 1.0 mm or more, the ductile failure was considered to occur in the steel, and calculation was made on the assumption that the toughness value was 1.0 mm.

[Table 3]

[Table 4]

Underlines were applied to indicate that the underlined steels are samples according to Conventional Example, or have values fall outside the favorable range.

[Table 5]

[Table 6]

Underlines were applied to indicate that the underlined steels are samples according to Comparative Example, or underlined values fall outside the range according to the present invention, or outside the favorable range.

[Table 7]

The target value for the be is set to 0.5 mm or more, and samples having be of 0.5 mm or more is determined to be acceptable.

[Table 8]

Underlines were applied to indicate that the underlined steels are samples according to Comparative Example, or underlined values fall outside the range according to the present invention, or outside the favorable range.

As can be understood from Table 1, Table 5, and Table 7, for the joints No. 1 to No. 31 according to the present invention, all of the components of the base metal and the welded metal, the number of oxides, the CeEBB and the C/CeEBB fall in the range according to the present invention. Further, the ratio of the fracture toughness value δc of the base material, the welded metal and the heat-affected zone (HAZ), the $\delta_{BM}/\delta_{WM}$, and the $\delta_{HAZ}/\delta_{WM}$ exhibit satisfying values.

Table 2, Table 6, and Table 8 show the results obtained from the joints No. 32 to No. 53 of Comparative Example. The joint No. 32 (Comparative Example) has reduced amount of C and increased amount of Mn, which results in an increase in the CeEBB, a reduction in the CTOD value $\delta_{HAZ}$ of the heat-affected zone (HAZ), and the insufficient $\delta_{HAZ}/\delta_{WM}$.

The joint No. 33 (Comparative Example) has increased amount of C, which results in a reduction in the CTOD value $\delta_{HAZ}$ of the heat-affected zone (HAZ), and insufficient $\delta_{HAZ}/\delta_{WM}$. The joint No. 35 (Comparative Example) is formed by the steel having reduced amount of Mn and reduced CeEBB, which results in a reduction in the strength of the base metal, a reduction in the CTOD value ($\delta_{WM}$) of the welded metal (WM), and an increase in the $\delta_{BM}/\delta_{WM}$.

The joint No. 34 (Comparative Example) has increased amount of Si, and the brittle phase appears in the heat-affected zone (HAZ) of the joint No. 34. Further, the CTOD value $\delta_{HAZ}$ of the HAZ is lower, and the $\delta_{HAZ}/\delta_{WM}$ is insufficient. The joint No. 36 (Comparative Example) is formed by the steel having increased amount of Mn, and increased CeEBB, which results in a reduction in the CTOD value $\delta_{HAZ}$ of the heat-affected zone (HAZ), and insufficient $\delta_{HAZ}/\delta_{WM}$.

The joints No. 37 and 38 (Comparative Example) have increased amount of P and increased amount of S, which results in a reduction in the CTOD value $\delta_{HAZ}$ of the heat-affected zone (HAZ), and insufficient $\delta_{HAZ}/\delta_{WM}$. The joints No. 39 and 40 (Comparative Example) have increased amount of Nb and increased amount of V, which results in a reduction in the CTOD value $\delta_{HAZ}$ of the heat-affected zone (HAZ), and insufficient $\delta_{HAZ}/\delta_{WM}$.

The joint No. 41 (Comparative Example) has reduced amount of Ti, the joint No. 43 (Comparative Example) has increased amount of Al, and the joint No. 45 (Comparative Example) has reduced amount of O. Thus, generation of the Ti-containing oxide is insufficient, which results in a reduction in the CTOD value $\delta_{HAZ}$ of the heat-affected zone (HAZ), and insufficient $\delta_{HAZ}/\delta_{WM}$.

The joint No. 42 (Comparative Example) has increased amount of Ti, the joint No. 44 (Comparative Example) has increased amount of N, and the joint No. 46 (Comparative Example) has increased amount of O. Thus, the coarsened oxide or nitride, which serves as the starting point of breakage, increases, which results in a reduction in the CTOD value $\delta_{HAZ}$ of the heat-affected zone (HAZ), and insufficient $\delta_{HAZ}/\delta_{WM}$.

The joint No. 47 (Comparative Example) is formed by the steel having reduced CeEBB, which results in a reduction in the strength of the base metal. The joint No. 48 (Comparative Example) is formed by the steel having increased CeEBB, which results in a reduction in the CTOD value $\delta_{HAZ}$ of the heat-affected zone (HAZ), and insufficient $\delta_{HAZ}/\delta_{WM}$. The joint No. 49 (Comparative Example) is formed by the steel having increased C/CeEBB, which results in a reduction in the CTOD value $\delta_{HAZ}$ of the heat-affected zone (HAZ), and insufficient $\delta_{HAZ}/\delta_{WM}$.

The joint No. 50 (Comparative Example) has the welded metal (WM) having reduced amount of Ni added, and the joint No. 52 (Comparative Example) has the welded metal (WM) having reduced CeEBW, which results in a reduction in the CTOD value $\delta_{WM}$ of the welded metal (WM) and an increase in the $\delta_{BM}/\delta_{WM}$.

The joint No. 51 (Comparative Example) has the welded metal (WM) having increased amount of Ni added, and the joint No. 53 (Comparative Example) has the welded metal (WM) having increased CeEBW, which results in a reduction in the CTOD value $\delta_{HAZ}$ of the heat-affected zone (HAZ), and insufficient $\delta_{HAZ}/\delta_{WM}$.

INDUSTRIAL APPLICABILITY

According to the present invention, it is possible to reduce the deterioration in the fracture toughness of the welded metal and the heat-affected zone of the electron-beam welded joint formed by the steel with a yield strength of 355 MPa class, as compared with the fracture toughness of the base metal. This makes it possible to provide the electron-beam welded joint having appropriately balanced fracture toughness between portions in the joint, and the steel that can be used for forming the welded joint and is suitable for construction of the foundation portion of the tower of a wind power generator at sea with a reduced cost. Thus, the present invention has high industrial applicability in the field of large-scale steel structure construction.

TABLE 1

| Steel No. | Chemical component (mass %) | | | | | | | | | | |
| --- | --- | --- | --- | --- | --- | --- | --- | --- | --- | --- | --- |
| | C | Si | Mn | P | S | Ti | Al | N | O | Nb | V |
| 1 | 0.052 | 0.15 | 1.59 | 0.006 | 0.002 | 0.010 | 0.003 | 0.0036 | 0.0023 | | |
| 2 | 0.029 | 0.08 | 2.32 | 0.006 | 0.009 | 0.010 | 0.002 | 0.0032 | 0.0032 | 0.001 | |
| 3 | 0.030 | 0.09 | 2.42 | 0.005 | 0.003 | 0.006 | 0.003 | 0.0035 | 0.0028 | | 0.019 |
| 4 | 0.033 | 0.03 | 2.11 | 0.005 | 0.005 | 0.012 | 0.003 | 0.0038 | 0.0017 | 0.020 | |
| 5 | 0.036 | 0.11 | 2.27 | 0.014 | 0.004 | 0.011 | 0.002 | 0.0039 | 0.0034 | 0.002 | |
| 6 | 0.035 | 0.23 | 2.26 | 0.005 | 0.004 | 0.010 | 0.003 | 0.0042 | 0.0033 | | |
| 7 | 0.036 | 0.12 | 2.14 | 0.005 | 0.006 | 0.012 | 0.002 | 0.0037 | 0.0019 | 0.012 | |
| 8 | 0.039 | 0.15 | 2.29 | 0.010 | 0.004 | 0.011 | 0.002 | 0.0057 | 0.0020 | 0.003 | 0.026 |
| 9 | 0.042 | 0.09 | 2.08 | 0.006 | 0.005 | 0.011 | 0.003 | 0.0044 | 0.0027 | | |
| 10 | 0.042 | 0.12 | 2.16 | 0.007 | 0.006 | 0.010 | 0.003 | 0.0037 | 0.0019 | 0.005 | |
| 11 | 0.045 | 0.11 | 2.05 | 0.011 | 0.001 | 0.009 | 0.002 | 0.0035 | 0.0033 | | |
| 12 | 0.044 | 0.12 | 1.91 | 0.006 | 0.002 | 0.015 | 0.003 | 0.0033 | 0.0022 | 0.011 | |
| 13 | 0.045 | 0.10 | 2.21 | 0.007 | 0.002 | 0.009 | 0.004 | 0.0020 | 0.0031 | | 0.020 |
| 14 | 0.049 | 0.09 | 1.94 | 0.005 | 0.002 | 0.010 | 0.004 | 0.0030 | 0.0026 | 0.012 | |
| 15 | 0.049 | 0.09 | 2.09 | 0.005 | 0.001 | 0.010 | 0.003 | 0.0036 | 0.0018 | 0.009 | |
| 16 | 0.048 | 0.10 | 2.18 | 0.003 | 0.002 | 0.011 | 0.003 | 0.0032 | 0.0019 | | |
| 17 | 0.049 | 0.10 | 2.12 | 0.005 | 0.001 | 0.010 | 0.003 | 0.0042 | 0.0024 | 0.002 | |
| 18 | 0.050 | 0.11 | 2.16 | 0.013 | 0.003 | 0.008 | 0.002 | 0.0039 | 0.0025 | 0.003 | |
| 19 | 0.051 | 0.13 | 1.84 | 0.007 | 0.004 | 0.012 | 0.002 | 0.0035 | 0.0019 | | |
| 20 | 0.049 | 0.12 | 1.83 | 0.006 | 0.003 | 0.011 | 0.002 | 0.0039 | 0.0018 | | |
| 21 | 0.052 | 0.14 | 2.31 | 0.006 | 0.002 | 0.010 | 0.002 | 0.0035 | 0.0018 | | |
| 22 | 0.054 | 0.11 | 1.82 | 0.004 | 0.010 | 0.009 | 0.003 | 0.0029 | 0.0024 | 0.002 | 0.019 |
| 23 | 0.058 | 0.09 | 1.93 | 0.005 | 0.001 | 0.008 | 0.002 | 0.0030 | 0.0027 | 0.006 | 0.015 |
| 24 | 0.059 | 0.13 | 1.76 | 0.006 | 0.004 | 0.011 | 0.003 | 0.0039 | 0.0013 | 0.007 | |
| 25 | 0.060 | 0.15 | 1.84 | 0.007 | 0.002 | 0.010 | 0.002 | 0.0043 | 0.0011 | 0.010 | |
| 26 | 0.059 | 0.14 | 2.04 | 0.007 | 0.003 | 0.011 | 0.003 | 0.0039 | 0.0012 | | |
| 27 | 0.076 | 0.06 | 2.14 | 0.005 | 0.003 | 0.009 | 0.003 | 0.0056 | 0.0021 | | |
| 28 | 0.081 | 0.10 | 1.82 | 0.006 | 0.002 | 0.009 | 0.002 | 0.0042 | 0.0023 | | |
| 29 | 0.080 | 0.07 | 1.94 | 0.005 | 0.004 | 0.011 | 0.002 | 0.0038 | 0.0023 | 0.010 | |
| 30 | 0.099 | 0.05 | 1.55 | 0.007 | 0.003 | 0.010 | 0.003 | 0.0041 | 0.0021 | | |
| 31 | 0.054 | 0.09 | 2.12 | 0.005 | 0.002 | 0.009 | 0.003 | 0.0020 | 0.0027 | | |

| Steel No. | Chemical component (mass %) | | | | | CeEBB (%) | C/CeEBB | Note |
| --- | --- | --- | --- | --- | --- | --- | --- | --- |
| | Cu | Ni | B | Cr | Mo | | | |
| 1 | | 0.20 | | | | 0.46 | 0.11 | Example according |
| 2 | 0.15 | 0.31 | | | | 0.64 | 0.05 | to the present |
| 3 | | | | | | 0.64 | 0.05 | invention |
| 4 | | | | | | 0.56 | 0.06 | |
| 5 | | 0.35 | | | | 0.63 | 0.06 | |
| 6 | 0.23 | | | | | 0.62 | 0.06 | |
| 7 | | | | | | 0.57 | 0.06 | |
| 8 | | | | | | 0.62 | 0.06 | |
| 9 | 0.15 | 0.48 | | | | 0.60 | 0.07 | |
| 10 | | | | | | 0.58 | 0.07 | |
| 11 | | | | | | 0.56 | 0.08 | |
| 12 | | | | | 0.50 | 0.62 | 0.07 | |
| 13 | | | | | | 0.60 | 0.07 | |

TABLE 1-continued

| | | | | | | | |
|---|---|---|---|---|---|---|---|
| 14 | | | | | | 0.53 | 0.09 |
| 15 | | | | | | 0.57 | 0.09 |
| 16 | | | | | | 0.59 | 0.08 |
| 17 | | 0.45 | | | | 0.61 | 0.08 |
| 18 | 0.22 | 0.25 | | | | 0.62 | 0.08 |
| 19 | | | 0.49 | | | 0.61 | 0.08 |
| 20 | | | | 0.49 | | 0.60 | 0.08 |
| 21 | | | | | | 0.63 | 0.08 |
| 22 | | | | | 0.50 | 0.61 | 0.09 |
| 23 | | | | | | 0.54 | 0.11 |
| 24 | 0.19 | 0.21 | 0.31 | | | 0.59 | 0.10 |
| 25 | 0.10 | 0.45 | | | | 0.56 | 0.11 |
| 26 | 0.16 | 0.24 | | | | 0.60 | 0.10 |
| 27 | | | | | | 0.61 | 0.12 |
| 28 | 0.09 | 0.29 | | | | 0.56 | 0.14 |
| 29 | | | | | | 0.57 | 0.14 |
| 30 | | | | 0.39 | 0.41 | 0.65 | 0.15 |
| 31 | | 0.0014 | | | | 0.58 | 0.09 |

TABLE 2

| Steel No. | Chemical component (mass %) | | | | | | | | | | | | | | | | CeEBB (%) | C/CeEBB | Note |
|---|---|---|---|---|---|---|---|---|---|---|---|---|---|---|---|---|---|---|---|
| | C | Si | Mn | P | S | Ti | Al | N | O | Nb | V | Cu | Ni | B | Cr | Mo | | | |
| 32 | 0.017 | 0.11 | 2.61 | 0.008 | 0.003 | 0.010 | 0.003 | 0.0030 | 0.0030 | | | | | | | | 0.67 | 0.03 | Comparative |
| 33 | 0.119 | 0.12 | 1.91 | 0.009 | 0.005 | 0.010 | 0.002 | 0.0037 | 0.0022 | 0.014 | | | | | | | 0.60 | 0.20 | Example |
| 34 | 0.074 | 0.34 | 1.92 | 0.004 | 0.005 | 0.011 | 0.003 | 0.0029 | 0.0024 | 0.011 | 0.019 | | | | | | 0.56 | 0.13 | |
| 35 | 0.020 | 0.16 | 1.47 | 0.006 | 0.003 | 0.013 | 0.002 | 0.0037 | 0.0010 | 0.020 | 0.020 | | 0.45 | | | | 0.42 | 0.05 | |
| 36 | 0.030 | 0.12 | 2.62 | 0.002 | 0.002 | 0.008 | 0.002 | 0.0033 | 0.0026 | | | | | | | | 0.69 | 0.04 | |
| 37 | 0.051 | 0.07 | 1.90 | 0.016 | 0.004 | 0.012 | 0.002 | 0.0038 | 0.0019 | 0.009 | | | | | | | 0.53 | 0.10 | |
| 38 | 0.036 | 0.16 | 1.76 | 0.008 | 0.012 | 0.009 | 0.004 | 0.0032 | 0.0024 | 0.008 | | 0.21 | 0.46 | | | | 0.52 | 0.07 | |
| 39 | 0.085 | 0.08 | 2.11 | 0.007 | 0.002 | 0.010 | 0.003 | 0.0038 | 0.0024 | 0.022 | | | | | | | 0.61 | 0.14 | |
| 40 | 0.082 | 0.09 | 1.78 | 0.010 | 0.006 | 0.010 | 0.003 | 0.0036 | 0.0020 | 0.011 | 0.033 | 0.10 | | | | | 0.54 | 0.15 | |
| 41 | 0.054 | 0.09 | 2.11 | 0.006 | 0.003 | 0.004 | 0.004 | 0.0035 | 0.0022 | | | | | | | | 0.58 | 0.09 | |
| 42 | 0.074 | 0.10 | 2.03 | 0.005 | 0.004 | 0.017 | 0.004 | 0.0033 | 0.0024 | | | | | | | | 0.58 | 0.13 | |
| 43 | 0.041 | 0.14 | 1.79 | 0.005 | 0.005 | 0.011 | 0.006 | 0.0038 | 0.0030 | 0.018 | 0.024 | 0.11 | 0.20 | | | | 0.51 | 0.08 | |
| 44 | 0.081 | 0.09 | 2.09 | 0.004 | 0.003 | 0.010 | 0.004 | 0.0066 | 0.0024 | 0.019 | 0.024 | | | | | | 0.61 | 0.13 | |
| 45 | 0.080 | 0.09 | 2.11 | 0.006 | 0.005 | 0.010 | 0.004 | 0.0036 | 0.0005 | 0.020 | | | 0.29 | | | | 0.63 | 0.13 | |
| 46 | 0.038 | 0.10 | 2.16 | 0.005 | 0.006 | 0.011 | 0.002 | 0.0037 | 0.0041 | 0.001 | 0.029 | | | | | | 0.58 | 0.07 | |
| 47 | 0.021 | 0.14 | 1.54 | 0.005 | 0.003 | 0.012 | 0.004 | 0.0035 | 0.0022 | | | | 0.03 | | | | 0.41 | 0.05 | |
| 48 | 0.034 | 0.12 | 2.41 | 0.004 | 0.003 | 0.012 | 0.003 | 0.0036 | 0.0025 | | | 0.21 | 0.18 | | | | 0.66 | 0.05 | |
| 49 | 0.099 | 0.11 | 1.96 | 0.003 | 0.003 | 0.014 | 0.002 | 0.0033 | 0.0022 | | | | | | 0.10 | 0.11 | 0.60 | 0.16 | |

TABLE 3

| Steel No. | Manufacturing conditions | | | | Note |
|---|---|---|---|---|---|
| | Cooling rate for cast piece (° C./min) | Heating temperature for steel piece (° C.) | Thermo-mechanical treatment | Plate thickness (mm) | |
| 1 | 10 | 1050 | ACC | 50 | Example according to the present invention |
| 2 | 12 | 1050 | ACC | 60 | |
| 3 | 9 | 1100 | ACC | 65 | |
| 4 | 16 | 1050 | ACC | 60 | |
| 5 | 12 | 1050 | ACC | 60 | |
| 6 | 11 | 1050 | ACC | 80 | |
| 7 | 13 | 1100 | ACC | 50 | |
| 8 | 14 | 1050 | ACC | 60 | |
| 9 | 16 | 1100 | CR | 55 | |
| 10 | 10 | 1100 | ACC | 60 | |
| 11 | 12 | 950 | ACC | 65 | |
| 12 | 9 | 1050 | ACC | 65 | |
| 13 | 14 | 1050 | CR | 90 | |
| 14 | 12 | 1100 | ACC | 80 | |
| 15 | 16 | 1050 | ACC | 75 | |
| 16 | 12 | 1050 | ACC | 55 | |
| 17 | 9 | 1000 | DQT | 100 | |
| 18 | 10 | 1050 | ACC | 65 | |
| 19 | 9 | 1050 | CR | 50 | |
| 20 | 13 | 1100 | DQT | 130 | |
| 21 | 12 | 1050 | ACC | 60 | |
| 22 | 10 | 1050 | ACC | 70 | |
| 23 | 15 | 1000 | ACC | 90 | |
| 24 | 9 | 1050 | DQT | 120 | |
| 25 | 10 | 950 | ACC | 50 | |
| 26 | 16 | 1100 | ACC | 80 | |
| 27 | 11 | 1150 | ACC | 100 | |
| 28 | 12 | 1100 | ACC | 75 | |
| 29 | 16 | 1150 | ACC | 80 | |
| 30 | 9 | 1100 | DQT | 150 | |
| 31 | 13 | 1050 | CR | 70 | |

TABLE 4

| Steel No. | Cooling rate for cast piece (° C./min) | Heating temperature for steel piece (° C.) | Thermo-mechanical treatment | Plate thickness (mm) | Note |
|---|---|---|---|---|---|
| 32 | 9 | 1050 | CR | 50 | Comparative Example |
| 33 | 11 | 1100 | DQT | 120 | |
| 34 | 14 | 1150 | ACC | 60 | |
| 35 | 16 | 1100 | ACC | 60 | |
| 36 | 10 | 1050 | ACC | 80 | |
| 37 | 13 | 1100 | CR | 50 | |
| 38 | 9 | 1100 | ACC | 55 | |
| 39 | 10 | 1150 | ACC | 80 | |
| 40 | 12 | 1100 | ACC | 90 | |
| 41 | 16 | 1050 | ACC | 50 | |
| 42 | 11 | 1100 | CR | 50 | |
| 43 | 9 | 1100 | ACC | 55 | |
| 44 | 10 | 1150 | ACC | 100 | |
| 45 | 12 | 1100 | ACC | 60 | |
| 46 | 12 | 1100 | ACC | 55 | |
| 47 | 10 | 1050 | ACC | 50 | |
| 48 | 10 | 1050 | ACC | 60 | |
| 49 | 12 | 1100 | DQT | 150 | |

TABLE 5

| Joint No. | Steel No. | C | Si | Mn | P | S | Ti | Al | N | O | Nb | V | Cu | Ni | B | Cr | Mo | CeEBW (%) | Note |
|---|---|---|---|---|---|---|---|---|---|---|---|---|---|---|---|---|---|---|---|
| 1 | 1 | 0.052 | 0.15 | 1.51 | 0.006 | 0.002 | 0.010 | 0.003 | 0.0036 | 0.0016 | | | | 1.98 | | | | 0.56 | Example according to the present invention |
| 2 | 2 | 0.029 | 0.08 | 1.86 | 0.006 | 0.009 | 0.010 | 0.002 | 0.0032 | 0.0017 | 0.001 | | 0.15 | 2.10 | | | | 0.64 | |
| 3 | 3 | 0.030 | 0.09 | 1.94 | 0.005 | 0.003 | 0.006 | 0.003 | 0.0035 | 0.0017 | | 0.019 | | 1.98 | | | | 0.65 | |
| 4 | 4 | 0.033 | 0.05 | 1.79 | 0.005 | 0.005 | 0.011 | 0.003 | 0.0038 | 0.0014 | 0.020 | | | 1.89 | | | | 0.61 | |
| 5 | 5 | 0.036 | 0.11 | 1.82 | 0.014 | 0.004 | 0.010 | 0.002 | 0.0039 | 0.0017 | 0.002 | | | 1.96 | | | | 0.62 | |
| 6 | 6 | 0.035 | 0.23 | 1.81 | 0.005 | 0.004 | 0.010 | 0.003 | 0.0042 | 0.0020 | | | 0.23 | 2.00 | | | | 0.64 | |
| 7 | 7 | 0.036 | 0.12 | 1.82 | 0.005 | 0.006 | 0.011 | 0.002 | 0.0037 | 0.0015 | 0.012 | | | 1.94 | | | | 0.62 | |
| 8 | 8 | 0.039 | 0.15 | 1.83 | 0.010 | 0.004 | 0.010 | 0.002 | 0.0057 | 0.0016 | 0.003 | 0.026 | | 1.93 | | | | 0.63 | |
| 9 | 9 | 0.042 | 0.09 | 1.77 | 0.006 | 0.005 | 0.010 | 0.003 | 0.0044 | 0.0017 | | | 0.15 | 2.05 | | | | 0.63 | |
| 10 | 10 | 0.042 | 0.12 | 1.84 | 0.007 | 0.006 | 0.010 | 0.003 | 0.0037 | 0.0015 | 0.005 | | | 2.10 | | | | 0.64 | |
| 11 | 11 | 0.045 | 0.11 | 1.74 | 0.011 | 0.001 | 0.009 | 0.002 | 0.0035 | 0.0019 | | | | 2.06 | | | | 0.62 | |
| 12 | 12 | 0.044 | 0.12 | 1.72 | 0.006 | 0.002 | 0.014 | 0.003 | 0.0033 | 0.0015 | 0.011 | | | 1.89 | | | 0.50 | 0.70 | |
| 13 | 13 | 0.045 | 0.10 | 1.88 | 0.007 | 0.002 | 0.009 | 0.004 | 0.0020 | 0.0017 | | 0.020 | | 1.97 | | | | 0.65 | |
| 14 | 14 | 0.049 | 0.09 | 1.75 | 0.005 | 0.002 | 0.010 | 0.004 | 0.0030 | 0.0018 | 0.012 | | | 1.97 | | | | 0.62 | |
| 15 | 15 | 0.049 | 0.09 | 1.78 | 0.005 | 0.001 | 0.010 | 0.003 | 0.0036 | 0.0014 | 0.009 | | | 2.21 | | | | 0.64 | |
| 16 | 16 | 0.048 | 0.10 | 1.85 | 0.003 | 0.002 | 0.010 | 0.003 | 0.0032 | 0.0015 | | | | 2.23 | | | | 0.66 | |
| 17 | 17 | 0.049 | 0.10 | 1.80 | 0.005 | 0.001 | 0.010 | 0.003 | 0.0042 | 0.0017 | 0.002 | | | 1.21 | | | | 0.58 | |
| 18 | 18 | 0.050 | 0.11 | 1.84 | 0.013 | 0.003 | 0.008 | 0.002 | 0.0039 | 0.0014 | 0.003 | | 0.22 | 1.45 | | | | 0.62 | |
| 19 | 19 | 0.051 | 0.13 | 1.66 | 0.007 | 0.004 | 0.011 | 0.002 | 0.0035 | 0.0015 | | | | | | | | | |
| 20 | 20 | 0.049 | 0.12 | 1.65 | 0.006 | 0.003 | 0.010 | 0.002 | 0.0039 | 0.0014 | | | | | | | | | |
| 21 | 21 | 0.052 | 0.14 | 1.85 | 0.006 | 0.002 | 0.010 | 0.002 | 0.0035 | 0.0014 | | | | | | | | | |
| 22 | 22 | 0.054 | 0.11 | 1.64 | 0.004 | 0.010 | 0.009 | 0.003 | 0.0029 | 0.0017 | 0.002 | | | | | | | | |
| 23 | 23 | 0.058 | 0.09 | 1.74 | 0.005 | 0.001 | 0.008 | 0.002 | 0.0030 | 0.0017 | 0.006 | | | | | | | | |
| 24 | 24 | 0.059 | 0.13 | 1.58 | 0.006 | 0.004 | 0.010 | 0.003 | 0.0039 | 0.0012 | 0.007 | | | | | | | | |
| 25 | 25 | 0.060 | 0.15 | 1.66 | 0.007 | 0.002 | 0.010 | 0.002 | 0.0043 | 0.0010 | 0.010 | | | | | | | | |
| 26 | 26 | 0.059 | 0.14 | 1.73 | 0.007 | 0.003 | 0.010 | 0.003 | 0.0039 | 0.0011 | | | | | | | | | |
| 27 | 27 | 0.076 | 0.06 | 1.82 | 0.005 | 0.003 | 0.009 | 0.003 | 0.0056 | 0.0017 | | | | | | | | | |
| 28 | 28 | 0.081 | 0.10 | 1.64 | 0.006 | 0.002 | 0.009 | 0.002 | 0.0042 | 0.0016 | | | | | | | | | |
| 29 | 29 | 0.080 | 0.07 | 1.75 | 0.005 | 0.004 | 0.010 | 0.002 | 0.0038 | 0.0016 | 0.010 | | | | | | | | |
| 30 | 30 | 0.099 | 0.05 | 1.32 | 0.007 | 0.003 | 0.010 | 0.003 | 0.0041 | 0.0017 | | | | | | | | | |
| 31 | 31 | 0.054 | 0.09 | 1.85 | 0.005 | 0.002 | 0.009 | 0.003 | 0.0020 | 0.0018 | | | | | | | | | |

TABLE 5-continued

|     |       |      |        |      |      |      |
| --- | ----- | ---- | ------ | ---- | ---- | ---- |
| 19  |       | 1.96 |        | 0.49 |      | 0.69 |
| 20  |       | 1.79 |        |      | 0.49 | 0.68 |
| 21  |       | 1.12 |        |      |      | 0.59 |
| 22  | 0.019 | 2.01 |        |      | 0.50 | 0.70 |
| 23  | 0.015 | 1.98 |        |      |      | 0.63 |
| 24  | 0.19  | 2.30 |        | 0.31 |      | 0.68 |
| 25  | 0.10  | 1.80 |        |      |      | 0.60 |
| 26  | 0.16  | 1.96 |        |      |      | 0.63 |
| 27  |       | 1.91 |        |      |      | 0.66 |
| 28  | 0.09  | 1.99 |        |      |      | 0.63 |
| 29  |       | 1.81 |        |      |      | 0.64 |
| 30  |       | 1.86 |        | 0.39 | 0.41 | 0.71 |
| 31  |       | 1.92 | 0.0014 |      |      | 0.64 |

TABLE 6

| Joint No. | Steel No. | C | Si | Mn | P | S | Ti | Al | N | O | Nb | V | Cu | Ni | B | Cr | Mo | CeEBW (%) | Note |
| --- | --- | --- | --- | --- | --- | --- | --- | --- | --- | --- | --- | --- | --- | --- | --- | --- | --- | --- | --- |
| 32 | 32 | <u>0.017</u> | 0.11 | 2.09 | 0.008 | 0.003 | 0.010 | 0.003 | 0.0030 | 0.0018 | | | | 2.10 | | | | 0.68 | Comparative Example |
| 33 | 33 | <u>0.119</u> | 0.12 | 1.72 | 0.009 | 0.005 | 0.010 | 0.002 | 0.0037 | 0.0015 | 0.014 | | | 1.98 | | | | 0.68 | |
| 34 | 34 | 0.074 | <u>0.34</u> | 1.73 | 0.004 | 0.005 | 0.010 | 0.003 | 0.0029 | 0.0017 | 0.011 | 0.019 | | 2.30 | | | | 0.66 | |
| 35 | 35 | 0.020 | 0.16 | 1.40 | 0.006 | 0.003 | 0.012 | 0.002 | 0.0037 | 0.0009 | 0.020 | 0.020 | | 1.80 | | | | <u>0.49</u> | |
| 36 | 36 | 0.030 | 0.12 | 2.10 | 0.002 | 0.002 | 0.008 | 0.002 | 0.0033 | 0.0018 | | | | 1.96 | | | | 0.68 | |
| 37 | 37 | 0.051 | 0.07 | 1.71 | <u>0.016</u> | 0.004 | 0.011 | 0.002 | 0.0038 | 0.0015 | 0.009 | | | 1.91 | | | | 0.61 | |
| 38 | 38 | 0.036 | 0.16 | 1.58 | 0.008 | <u>0.012</u> | 0.009 | 0.004 | 0.0032 | 0.0017 | 0.008 | | 0.21 | 2.21 | | | | 0.59 | |
| 39 | 39 | 0.085 | 0.08 | 1.79 | 0.007 | 0.002 | 0.010 | 0.003 | 0.0038 | 0.0017 | <u>0.022</u> | | | 1.94 | | | | 0.66 | |
| 40 | 40 | 0.082 | 0.09 | 1.69 | 0.010 | 0.006 | 0.010 | 0.003 | 0.0036 | 0.0016 | 0.011 | <u>0.033</u> | 0.10 | 1.80 | | | | 0.64 | |
| 41 | 41 | 0.054 | 0.09 | 1.79 | 0.006 | 0.003 | <u>0.004</u> | 0.004 | 0.0035 | 0.0015 | | | | 1.96 | | | | 0.63 | |
| 42 | 42 | 0.074 | 0.10 | 1.73 | 0.005 | 0.004 | <u>0.016</u> | 0.004 | 0.0033 | 0.0017 | | | | 1.80 | | | | 0.63 | |
| 43 | 43 | 0.041 | 0.14 | 1.61 | 0.005 | 0.005 | 0.010 | <u>0.006</u> | 0.0038 | 0.0018 | 0.018 | 0.024 | 0.11 | 1.96 | | | | 0.59 | |
| 44 | 44 | 0.081 | 0.09 | 1.78 | 0.004 | 0.003 | 0.010 | 0.004 | <u>0.0066</u> | 0.0017 | 0.019 | 0.024 | | 2.21 | | | | 0.68 | |
| 45 | 45 | 0.080 | 0.09 | 1.79 | 0.006 | 0.005 | 0.010 | 0.004 | 0.0036 | <u>0.0003</u> | 0.020 | | | 2.23 | | | | 0.68 | |
| 46 | 46 | 0.038 | 0.10 | 1.84 | 0.005 | 0.006 | 0.010 | 0.002 | 0.0037 | <u>0.0023</u> | 0.001 | 0.029 | | 1.99 | | | | 0.64 | |
| 47 | 47 | 0.021 | 0.14 | 1.48 | 0.005 | 0.003 | 0.011 | 0.004 | 0.0035 | 0.0015 | | | | 2.27 | | | | <u>0.54</u> | |
| 48 | 48 | 0.034 | 0.12 | 1.93 | 0.004 | 0.003 | 0.011 | 0.003 | 0.0036 | 0.0018 | | | 0.21 | 1.58 | | | | 0.64 | |
| 49 | 49 | 0.099 | 0.11 | 1.76 | 0.003 | 0.003 | 0.013 | 0.002 | 0.0033 | 0.0015 | | | 0.10 | 1.10 | | | | 0.62 | |
| 50 | 6 | 0.035 | 0.23 | 1.81 | 0.005 | 0.004 | 0.010 | 0.003 | 0.0042 | 0.0020 | | | 0.23 | <u>0.86</u> | | | | 0.56 | |
| 51 | 22 | 0.054 | 0.11 | 1.64 | 0.004 | 0.010 | 0.009 | 0.003 | 0.0029 | 0.0017 | 0.002 | 0.019 | | 2.36 | | | 0.50 | 0.72 | |
| 52 | 14 | 0.049 | 0.09 | 1.75 | 0.005 | 0.002 | 0.010 | 0.004 | 0.0030 | 0.0018 | 0.012 | | | 1.02 | | | | <u>0.55</u> | |
| 53 | 30 | 0.099 | 0.05 | 1.32 | 0.007 | 0.003 | 0.010 | 0.003 | 0.0041 | 0.0017 | | | | 2.29 | | 0.39 | 0.41 | <u>0.74</u> | |

TABLE 7

| Joint No. | Steel No. | Manufacturing conditions | | | Plate thickness (mm) | Properties of base material | | | |
| --- | --- | --- | --- | --- | --- | --- | --- | --- | --- |
| | | Cooling rate for cast piece (° C./min) | Heating temperature for steel piece (° C.) | Thermomechanical treatment | | Yield strength (MPa) | Tensile strength (MPa) | Ti-containing oxide having equivalent circle diameter of 0.05 to 0.5 μm (pieces/mm$^2$) | Number of all oxide having equivalent circle diameter of 1.0 mm or more (pieces/mm$^2$) |
| 1 | 1 | 11 | 1050 | ACC | 50 | 392 | 515 | 7.1 × 10$^3$ | 9 |
| 2 | 2 | 12 | 1050 | ACC | 60 | 403 | 512 | 7.6 × 10$^3$ | 8 |
| 3 | 3 | 9 | 1100 | ACC | 65 | 376 | 487 | 1.2 × 10$^4$ | 19 |
| 4 | 4 | 16 | 1050 | ACC | 60 | 383 | 502 | 1.3 × 10$^4$ | 13 |
| 5 | 5 | 12 | 1050 | ACC | 60 | 401 | 503 | 1.6 × 10$^4$ | 18 |
| 6 | 6 | 11 | 1050 | ACC | 80 | 376 | 488 | 6.6 × 10$^3$ | 18 |
| 7 | 7 | 13 | 1100 | ACC | 50 | 388 | 505 | 1.8 × 10$^4$ | 19 |
| 8 | 8 | 14 | 1050 | ACC | 60 | 397 | 509 | 3.9 × 10$^3$ | 14 |
| 9 | 9 | 16 | 1100 | CR | 55 | 379 | 492 | 1.4 × 10$^4$ | 13 |
| 10 | 10 | 10 | 1100 | ACC | 60 | 402 | 505 | 7.7 × 10$^3$ | 20 |
| 11 | 11 | 12 | 950 | ACC | 65 | 391 | 491 | 1.0 × 10$^4$ | 12 |
| 12 | 12 | 9 | 1050 | ACC | 65 | 382 | 499 | 1.2 × 10$^4$ | 18 |
| 13 | 13 | 14 | 1050 | CR | 90 | 396 | 502 | 1.6 × 10$^4$ | 16 |
| 14 | 14 | 11 | 1100 | ACC | 80 | 387 | 501 | 1.4 × 10$^4$ | 18 |
| 15 | 15 | 16 | 1050 | ACC | 75 | 399 | 498 | 1.4 × 10$^4$ | 13 |
| 16 | 16 | 12 | 1050 | ACC | 55 | 380 | 491 | 1.6 × 10$^4$ | 19 |
| 17 | 17 | 9 | 1000 | DQT | 100 | 402 | 506 | 8.4 × 10$^3$ | 13 |
| 18 | 18 | 10 | 1050 | ACC | 65 | 379 | 488 | 1.4 × 10$^4$ | 20 |

TABLE 7-continued

| | | | | | | | | | |
|---|---|---|---|---|---|---|---|---|---|
| 19 | 19 | 9 | 1050 | CR | 50 | 386 | 500 | $1.0 \times 10^4$ | 16 |
| 20 | 20 | 13 | 1100 | DQT | 130 | 396 | 488 | $1.2 \times 10^4$ | 13 |
| 21 | 21 | 12 | 1050 | ACC | 60 | 379 | 502 | $1.3 \times 10^4$ | 17 |
| 22 | 22 | 9 | 1050 | ACC | 70 | 388 | 503 | $9.1 \times 10^3$ | 14 |
| 23 | 23 | 15 | 1000 | ACC | 90 | 394 | 503 | $2.0 \times 10^4$ | 13 |
| 24 | 24 | 10 | 1050 | DQT | 120 | 387 | 502 | $1.1 \times 10^4$ | 15 |
| 25 | 25 | 9 | 950 | ACC | 50 | 396 | 499 | $1.4 \times 10^4$ | 20 |
| 26 | 26 | 16 | 1100 | ACC | 80 | 375 | 487 | $1.8 \times 10^4$ | 16 |
| 27 | 27 | 11 | 1150 | ACC | 100 | 377 | 486 | $9.0 \times 10^3$ | 18 |
| 28 | 28 | 12 | 1100 | ACC | 75 | 386 | 499 | $1.5 \times 10^4$ | 17 |
| 29 | 29 | 16 | 1150 | ACC | 80 | 401 | 491 | $1.2 \times 10^4$ | 13 |
| 30 | 30 | 9 | 1100 | DQT | 150 | 385 | 498 | $1.2 \times 10^4$ | 18 |
| 31 | 31 | 13 | 1050 | CR | 70 | 379 | 474 | $1.1 \times 10^4$ | 15 |

| | Toughness of welded joint δc | | | | | |
|---|---|---|---|---|---|---|
| Joint No. | [HAZ] minimum value (mm) | [WM] minimum value (mm) | [BM] minimum value (mm) | $\delta_{HAZ}/\delta_{WM}$ | $\delta_{BM}/\delta_{WM}$ | Note |
| 1 | 0.82 | 1.00 | 1.00 | 0.82 | 1.00 | Example according to the present invention |
| 2 | 0.78 | 1.00 | 1.00 | 0.78 | 1.00 | |
| 3 | 0.80 | 0.99 | 0.99 | 0.81 | 1.00 | |
| 4 | 0.85 | 1.00 | 1.00 | 0.85 | 1.00 | |
| 5 | 0.71 | 1.00 | 1.00 | 0.71 | 1.00 | |
| 6 | 0.67 | 0.96 | 0.96 | 0.70 | 1.00 | |
| 7 | 0.79 | 1.00 | 1.00 | 0.79 | 1.00 | |
| 8 | 0.87 | 1.00 | 0.96 | 0.87 | 0.96 | |
| 9 | 0.84 | 1.00 | 1.00 | 0.84 | 1.00 | |
| 10 | 0.67 | 1.00 | 0.97 | 0.67 | 0.97 | |
| 11 | 0.65 | 1.00 | 0.96 | 0.65 | 0.96 | |
| 12 | 0.69 | 1.00 | 1.00 | 0.69 | 1.00 | |
| 13 | 0.86 | 1.00 | 0.97 | 0.86 | 0.97 | |
| 14 | 0.59 | 0.99 | 1.00 | 0.60 | 1.01 | |
| 15 | 0.77 | 1.00 | 1.00 | 0.77 | 1.00 | |
| 16 | 0.87 | 1.00 | 1.00 | 0.87 | 1.00 | |
| 17 | 0.82 | 0.96 | 1.00 | 0.85 | 1.04 | |
| 18 | 0.74 | 1.00 | 1.00 | 0.74 | 1.00 | |
| 19 | 0.73 | 1.00 | 1.00 | 0.73 | 1.00 | |
| 20 | 0.76 | 1.00 | 1.00 | 0.76 | 1.00 | |
| 21 | 0.63 | 1.00 | 1.00 | 0.63 | 1.00 | |
| 22 | 0.65 | 1.00 | 1.00 | 0.65 | 1.00 | |
| 23 | 0.68 | 1.00 | 1.00 | 0.68 | 1.00 | |
| 24 | 0.66 | 1.00 | 1.00 | 0.66 | 1.00 | |
| 25 | 0.81 | 1.00 | 0.96 | 0.81 | 0.96 | |
| 26 | 0.80 | 1.00 | 1.00 | 0.80 | 1.00 | |
| 27 | 0.69 | 1.00 | 0.97 | 0.69 | 0.97 | |
| 28 | 0.71 | 0.96 | 1.00 | 0.74 | 1.04 | |
| 29 | 0.77 | 1.00 | 1.00 | 0.77 | 1.00 | |
| 30 | 0.69 | 0.97 | 1.00 | 0.71 | 1.03 | |
| 31 | 0.82 | 1.00 | 1.00 | 0.82 | 1.00 | |

TABLE 8

| | | Manufacturing conditions | | | Properties of base material | | | |
|---|---|---|---|---|---|---|---|---|
| Joint No. | Steel No. | Cooling rate for cast piece (° C./min) | Heating temperature for steel piece (° C.) | Thermo-mechanical treatment | Plate thickness (mm) | Yield strength (MPa) | Tensile strength (MPa) | Ti-containing oxide having equivalent circle diameter of 0.05 to 0.5 μm (pieces/mm²) | Number of all oxide having equivalent circle diameter of 1.0 mm or more (pieces/mm²) |
| 32 | <u>32</u> | 9 | 1050 | CR | 50 | 362 | 487 | $6.5 \times 10^3$ | 11 |
| 33 | <u>33</u> | 11 | 1100 | DQT | 120 | 400 | 502 | $7.9 \times 10^3$ | 9 |
| 34 | <u>34</u> | 14 | 1150 | ACC | 60 | 396 | 499 | $1.0 \times 10^4$ | 14 |
| 35 | <u>35</u> | 16 | 1100 | ACC | 60 | 337 | 452 | $5.6 \times 10^4$ | 13 |
| 36 | <u>36</u> | 10 | 1050 | ACC | 80 | 425 | 534 | $7.1 \times 10^3$ | 18 |
| 37 | <u>37</u> | 13 | 1100 | CR | 50 | 388 | 505 | $9.4 \times 10^3$ | 15 |
| 38 | <u>38</u> | 9 | 1100 | ACC | 55 | 398 | 503 | $1.3 \times 10^4$ | 19 |
| 39 | <u>39</u> | 10 | 1150 | ACC | 80 | 377 | 499 | $7.7 \times 10^3$ | 14 |
| 40 | <u>40</u> | 12 | 1100 | ACC | 90 | 379 | 504 | $8.6 \times 10^3$ | 17 |
| 41 | <u>41</u> | 16 | 1050 | ACC | 50 | 386 | 503 | <u>$9.2 \times 10^2$</u> | 13 |
| 42 | <u>42</u> | 11 | 1100 | CR | 50 | 397 | 498 | <u>$5.7 \times 10^4$</u> | <u>22</u> |
| 43 | <u>43</u> | 9 | 1100 | ACC | 55 | 379 | 487 | <u>$9.6 \times 10^2$</u> | 6 |
| 44 | <u>44</u> | 10 | 1150 | ACC | 100 | 401 | 481 | <u>$7.2 \times 10^3$</u> | 16 |
| 45 | <u>45</u> | 12 | 1100 | ACC | 60 | 403 | 501 | <u>$8.6 \times 10^2$</u> | 17 |

TABLE 8-continued

| | | | | | | | | | |
|---|---|---|---|---|---|---|---|---|---|
| 46 | 46 | 12 | 1100 | ACC | 55 | 374 | 500 | $1.3 \times 10^5$ | 48 |
| 47 | 47 | 10 | 1050 | ACC | 50 | 326 | 451 | $8.9 \times 10^3$ | 19 |
| 48 | 48 | 10 | 1050 | ACC | 60 | 386 | 488 | $7.2 \times 10^3$ | 13 |
| 49 | 49 | 12 | 1100 | DQT | 150 | 382 | 506 | $1.3 \times 10^4$ | 17 |
| 50 | 6 | 11 | 1050 | ACC | 80 | 376 | 488 | $6.6 \times 10^3$ | 18 |
| 51 | 22 | 9 | 1050 | ACC | 70 | 388 | 503 | $9.1 \times 10^3$ | 14 |
| 52 | 14 | 11 | 1100 | ACC | 80 | 387 | 501 | $1.4 \times 10^4$ | 18 |
| 53 | 30 | 9 | 1100 | DQT | 150 | 385 | 498 | $1.2 \times 10^4$ | 18 |

| Joint No. | Toughness of welded joint δc | | | | | |
|---|---|---|---|---|---|---|
| | [HAZ] minimum value (mm) | [WM] minimum value (mm) | [BM] minimum value (mm) | $\delta_{HAZ}/\delta_{WM}$ | $\delta_{BM}/\delta_{WM}$ | Note |
| 32 | 0.33 | 1.00 | 0.95 | 0.33 | 0.95 | Comparative |
| 33 | 0.44 | 1.00 | 1.00 | 0.44 | 1.00 | Example |
| 34 | 0.20 | 0.96 | 1.00 | 0.21 | 1.04 | |
| 35 | 0.39 | 0.42 | 1.00 | 0.93 | 2.38 | |
| 36 | 0.09 | 0.96 | 0.96 | 0.09 | 1.00 | |
| 37 | 0.16 | 0.94 | 0.93 | 0.17 | 0.99 | |
| 38 | 0.11 | 0.95 | 0.96 | 0.12 | 1.01 | |
| 39 | 0.08 | 0.96 | 1.00 | 0.08 | 1.04 | |
| 40 | 0.16 | 1.00 | 1.00 | 0.16 | 1.00 | |
| 41 | 0.20 | 0.95 | 1.00 | 0.21 | 1.05 | |
| 42 | 0.18 | 1.00 | 0.96 | 0.18 | 0.96 | |
| 43 | 0.19 | 1.00 | 1.00 | 0.19 | 1.00 | |
| 44 | 0.14 | 1.00 | 1.00 | 0.14 | 1.00 | |
| 45 | 0.04 | 0.96 | 0.95 | 0.04 | 0.99 | |
| 46 | 0.05 | 1.00 | 1.00 | 0.05 | 1.00 | |
| 47 | 0.26 | 1.00 | 1.00 | 0.26 | 1.00 | |
| 48 | 0.24 | 1.00 | 1.00 | 0.24 | 1.00 | |
| 49 | 0.25 | 0.97 | 1.00 | 0.26 | 1.03 | |
| 50 | 0.07 | 0.10 | 1.00 | 0.70 | 10.00 | |
| 51 | 0.06 | 0.95 | 1.00 | 0.06 | 1.05 | |
| 52 | 0.08 | 0.08 | 1.00 | 1.00 | 12.50 | |
| 53 | 0.07 | 0.95 | 1.00 | 0.07 | 1.05 | |

The invention claimed is:

1. An electron-beam welded joint having a welded metal and obtained by applying an electron beam to a steel, the steel having a composition including, by mass %:
C: 0.049% to 0.10%;
Si: 0.08% to 0.30%;
Mn: 1.5% to 2.5%;
Ti: 0.005% to 0.015%;
N: 0.0020% to 0.0060%;
O: 0.0010% to 0.0035%;
Nb: 0% to 0.020%;
V: 0% to 0.030%;
Cr: 0% to 0.50%;
Mo: 0% to 0.50%;
Cu: 0% to 0.25%;
Ni: 0% to 0.50%;
B: 0% to 0.0030%;
S: limited to not more than 0.010%;
P: limited to not more than 0.015%; and
Al: limited to not more than 0.004%,
with a balance including iron and inevitable impurities, wherein
an index value CeEBB obtained by substituting the composition of the steel into following Formula 1 falls in the range of 0.42% to 0.65%,
a number of oxides having an equivalent circle diameter of not less than 1.0 μm is not more than 20 pieces/mm² at a thickness center portion in cross section along a thickness direction of the steel,
a number of oxides containing Ti of not less than 10% and having an equivalent circle diameter of not less than 0.05 μm and less than 0.5 μm falls in the range of $3.9 \times 10^3$ to $1 \times 10^5$ pieces/mm² in the thickness center portion, the welded metal has a composition including, by mass %:
C: 0.049% to 0.10%;
Si: 0.08% to 0.30%;
Mn: 1.2% to 2.4%;
Ni: 1.0% to 2.3%;
Ti: 0.005% to 0.015%;
N: 0.0020% to 0.0060%;
O: 0.0004% to 0.0020%;
Nb: 0% to 0.020%;
V: 0% to 0.030%;
Cr: 0% to 0.50%;
Mo: 0% to 0.50%;
Cu: 0% to 0.25%;
B: 0% to 0.0030%;
S: limited to not more than 0.010%;
P: limited to not more than 0.015%; and
Al: limited to not more than 0.004%,
with a balance including iron and inevitable impurities,
an index value CeEBW obtained by substituting the composition of the welded metal into following Formula 2 falls in the range of 0.56 to 0.73%, $$CeEBB = C + \tfrac{1}{4}Mn + \tfrac{1}{15}Cu + \tfrac{1}{15}Ni + \tfrac{1}{5}Cr + \tfrac{1}{5}Mo + \tfrac{1}{5}V \quad \text{(Formula 1)}$$

where C, Mn, Cu, Ni, Cr, Mo, and V represent mass % of elements contained in the composition of the steel, $$CeEBW = C + \tfrac{1}{4}Mn + \tfrac{1}{15}Cu + \tfrac{1}{15}Ni + \tfrac{1}{5}Cr + \tfrac{1}{5}Mo + \tfrac{1}{5}V \quad \text{(Formula 2)}$$

where C, Mn, Cu, Ni, Cr, Mo, and V represent mass % of elements contained in the composition of the welded metal, and a yield point of the steel is 315 MPa to 380 MPa.

2. The electron-beam welded joint according to claim 1, wherein
a C/CeEBB, which is a ratio of the amount of C by mass % in the steel relative to the index value CeEBB, falls in the range of 0.02 to 0.15.

3. The electron-beam welded joint according to claim 1, wherein
the steel has a thickness in the range of 45 to 150 mm.

4. The electron-beam welded joint according to claim 1, satisfying $$0.8 \leq \delta_{BM}/\delta_{WM} \leq 1.25, \text{ and}$$

$$0.5 \leq \delta_{HAZ}/\delta_{WM} \leq 1.1, \text{ where}$$

$\delta_{WM}$ is a CTOD value of the welded metal,
$\delta_{HAZ}$ is a CTOD value of a weld heat-affected zone, and
$\delta_{BM}$ is a CTOD value of the steel.

5. The electron-beam welded joint according to claim 1, wherein
the amount of O is 0.0010% to 0.0025% in the steel.

6. The electron-beam welded joint according to claim 1, wherein
the amount of Nb is 0% to 0.003% in the steel.

7. The electron-beam welded joint according to claim 1, wherein
the amount of O is 0.0004% to 0.0018% in the welded metal.

8. A steel for electron-beam welding having a composition including by mass %:
C: 0.049% to 0.10%;
Si: 0.08% to 0.30%;
Mn: 1.5% to 2.5%;
Ti: 0.005% to 0.015%;
N: 0.0020% to 0.0060%;
O: 0.0010% to 0.0035%;
Nb: 0% to 0.020%;
V: 0% to 0.030%;
Cr: 0% to 0.50%;
Mo: 0% to 0.50%;
Cu: 0% to 0.25%;
Ni: 0% to 0.50%;
B: 0% to 0.0030%;
S: limited to not more than 0.010% or less;
P: limited to not more than 0.015% or less; and
Al: limited to not more than 0.004%or less;
with a balance including iron and inevitable impurities, wherein
an index value CeEBB obtained by substituting the composition of the steel into following Formula 1 falls in the range of 0.42 to 0.65%,
a number of oxides having an equivalent circle diameter of not less than 1.0 μm is not more than 20 pieces/mm² at a thickness center portion in cross section along a thickness direction of the steel,
a number of oxides containing Ti of not less than 10% and having an equivalent circle diameter of not less than 0.05 μm and less than 0.5 μm falls in the range of $3.9 \times 10^3$ to $1 \times 10^5$ pieces/mm² at the thickness center portion, $$\text{CeEBB} = C + \tfrac{1}{4}Mn + \tfrac{1}{15}Cu + \tfrac{1}{15}Ni + \tfrac{1}{5}Cr + \tfrac{1}{5}Mo + \tfrac{1}{5}V \quad \text{(Formula 1)}$$

where C, Mn, Cu, Ni, Cr, Mo, and V represent mass % of elements in the composition of the steel, and
a yield point of the steel is 315 MPa to 380 MPa.

9. The steel for electron-beam welding according to claim 8, wherein
a C/CeEBB, which is a ratio of the amount of C by mass % in the steel relative to the CeEBB, falls in the range of 0.02 to 0.15.

10. The steel for electron-beam welding according to claim 8, wherein
the thickness of the steel falls in the range of 45 to 150 mm.

11. The steel for electron-beam welding according to claim 8, wherein
the amount of O is 0.0010% to 0.0025%.

12. The steel for electron-beam welding according to claim 8, wherein
the amount of Nb is 0% to 0.003%.

13. An electron-beam welded joint having a welded metal and obtained by applying an electron beam to a steel, the steel having a composition including, by mass %:
C: 0.049% to 0.10%;
Si: 0.03% to 0.30%;
Mn: 1.5% to 2.5%;
Ti: 0.005% to 0.015%;
N: 0.0020% to 0.0060%;
O: 0.0010% to 0.0035%;
Nb: 0% to 0.003%;
V: 0% to 0.030%;
Cr: 0% to 0.50%;
Mo: 0% to 0.50%;
Cu: 0% to 0.25%;
Ni: 0% to 0.50%;
B: 0% to 0.0030%;
S: limited to not more than 0.010%;
P: limited to not more than 0.015%; and
Al: limited to not more than 0.004%,
with a balance including iron and inevitable impurities, wherein
an index value CeEBB obtained by substituting the composition of the steel into following Formula 1 falls in the range of 0.42% to 0.65%,
a number of oxides having an equivalent circle diameter of not less than 1.0 μm is not more than 20 pieces/mm² at a thickness center portion in cross section along a thickness direction of the steel,
a number of oxides containing Ti of not less than 10% and having an equivalent circle diameter of not less than 0.05 μm and less than 0.5 μm falls in the range of $3.9 \times 10^3$ to $1 \times 10^5$ pieces/mm² in the thickness center portion,
the welded metal has a composition including, by mass %:
C: 0.049% to 0.10%;
Si: 0.03% to 0.30%;
Mn: 1.2% to 2.4%;
Ni: 1.0% to 2.3%;
Ti: 0.005% to 0.015%
N: 0.0020% to 0.0060%;
O: 0.0004% to 0.0020%;
Nb: 0% to 0.003%;
V: 0% to 0.030%;
Cr: 0% to 0.50%;
Mo: 0% to 0.50%;
Cu: 0% to 0.25%;
B: 0% to 0.0030%;
S: limited to not more than 0.010%;
P: limited to not more than 0.015%; and
Al: limited to not more than 0.004%,
with a balance including iron and inevitable impurities,
an index value CeEBW obtained by substituting the composition of the welded metal into following Formula 2 falls in the range of 0.56 to 0.73%, $$\text{CeEBB} = C + \tfrac{1}{4}Mn + \tfrac{1}{15}Cu + \tfrac{1}{15}Ni + \tfrac{1}{5}Cr + \tfrac{1}{5}Mo + \tfrac{1}{5}V \quad \text{(Formula 1)}$$

where C, Mn, Cu, Ni, Cr, Mo, and V represent mass % of elements contained in the composition of the steel, $$CeEBW = C + \frac{1}{4}Mn + \frac{1}{15}Cu + \frac{1}{15}Ni + \frac{1}{5}Cr + \frac{1}{5}Mo + \frac{1}{5}V \quad \text{(Formula 2)}$$

where C, Mn, Cu, Ni, Cr, Mo, and V represent mass % of elements contained in the composition of the welded metal, and
a yield point of the steel is 315 MPa to 380 MPa.

14. The electron-beam welded joint according to claim 13, wherein
a C/CeEBB, which is a ratio of the amount of C by mass % in the steel relative to the index value CeEBB, falls in the range of 0.02 to 0.15.

15. The electron-beam welded joint according to claim 13, wherein
the steel has a thickness in the range of 45 to 150 mm.

16. The electron-beam welded joint according to claim 13, satisfying $$0.8 \leq \delta_{BM}/\delta_{WM} \leq 1.25, \text{ and}$$

$$0.5 \leq \delta_{HAZ}/\delta_{WM} \leq 1.1, \text{ where}$$

$\delta_{WM}$ is a CTOD value of the welded metal,
$\delta_{HAZ}$ is a CTOD value of a weld heat-affected zone, and
$\delta_{BM}$ is a CTOD value of the steel.

17. The electron-beam welded joint according to claim 13, wherein
the amount of O is 0.0010% to 0.0025% in the steel.

18. The electron-beam welded joint according to claim 13, wherein
the amount of Si is 0.08% to 0.30% in the steel.

19. The electron-beam welded joint according to claim 13, wherein
the amount of O is 0.0004% to 0.0018% in the welded metal.

20. A steel for electron-beam welding having a composition including by mass %:
C: 0.049% to 0.10%;
Si: 0.03% to 0.30%;
Mn: 1.5% to 2.5%;
Ti: 0.005% to 0.015%;
N: 0.0020% to 0.0060%;
O: 0.0010% to 0.0035%;
Nb: 0% to 0.003%;
V: 0% to 0.030%;
Cr: 0% to 0.50%;
Mo: 0% to 0.50%;
Cu: 0% to 0.25%;
Ni: 0% to 0.50%;
B: 0% to 0.0030%;
S: limited to not more than 0.010% or less;
P: limited to not more than 0.015% or less; and
Al: limited to not more than 0.004% or less;
with a balance including iron and inevitable impurities, wherein
an index value CeEBB obtained by substituting the composition of the steel into following Formula 1 falls in the range of 0.42 to 0.65%,
a number of oxides having an equivalent circle diameter of not less than 1.0 μm is not more than 20 pieces/mm² at a thickness center portion in cross section along a thickness direction of the steel,
a number of oxides containing Ti of not less than 10% and having an equivalent circle diameter of not less than 0.05 μm and less than 0.5 μm falls in the range of $3.9 \times 10^3$ to $1 \times 10^5$ pieces/mm² at the thickness center portion, $$CeEBB = C + \frac{1}{4}Mn + \frac{1}{15}Cu + \frac{1}{15}Ni + \frac{1}{5}Cr + \frac{1}{5}Mo + \frac{1}{5}V \quad \text{(Formula 1)},$$

where C, Mn, Cu, Ni, Cr, Mo, and V represent mass % of elements in the composition of the steel, and
a yield point of the steel is 315 MPa to 380 MPa.

21. The steel for electron-beam welding according to claim 20, wherein
a C/CeEBB, which is a ratio of the amount of C by mass % in the steel relative to the CeEBB, falls in the range of 0.02 to 0.15.

22. The steel for electron-beam welding according to claim 20, wherein the thickness of the steel falls in the range of 45 to 150 mm.

23. The steel for electron-beam welding according to claim 20, wherein the amount of O is 0.0010% to 0.0025%.

24. The steel for electron-beam welding according to claim 20, wherein
the amount of Si is 0.08% to 0.30%.

25. A method of manufacturing a steel for electron-beam welding having a composition including by mass %:
C: 0.02% to 0.10%;
Si: 0.03% to 0.30%;
Mn: 1.5% to 2.5%;
Ti: 0.005% to 0.015%;
N: 0.0020% to 0.0060%;
O: 0.0010% to 0.0035%;
Nb: 0% to 0.020%;
V: 0% to 0.030%;
Cr: 0% to 0.50%;
Mo: 0% to 0.50%;
Cu: 0% to 0.25%;
Ni: 0% to 0.50%;
B: 0% to 0.0030%;
S: limited to not more than 0.010%;
P: limited to not more than 0.015%; and
Al: limited to not more than 0.004%,
with a balance including iron and inevitable impurities, wherein
an index value CeEBB obtained by substituting the composition of the steel into following Formula 1 falls in the range of 0.42 to 0.65%,
a number of oxides having an equivalent circle diameter of not less than 1.0 μm is not more than 20 pieces/mm² at a thickness center portion in cross section along a thickness direction of the steel, and
a number of oxides containing Ti of not less than 10% and having an equivalent circle diameter of not less than 0.05 μm and less than 0.5 μm falls in the range of $3.9 \times 10^3$ to $1 \times 10^5$ pieces/mm² at the thickness center portion, $$CeEBB = C + \frac{1}{4}Mn + \frac{1}{15}Cu + \frac{1}{15}Ni + \frac{1}{5}Cr + \frac{1}{5}Mo + \frac{1}{5}V \quad \text{(Formula 1)},$$

where C, Mn, Cu, Ni, Cr, Mo, and V represent mass % of elements in the composition of the steel, the method including:
after a steel is subjected to casting, cooling the steel in a manner such that a cooling rate in a temperature range of 1300 to 1100° C. is not less than 9° C./min; and
after casting, heating the steel to a temperature range of 950 to 1150° C., and then, applying a thermo-mechanical treatment.

26. The method according to claim 25, wherein a C/CeEBB, which is a ratio of the amount of C by mass % in the steel relative to the CeEBB, falls in the range of 0.02 to 0.15.

* * * * *